US012749044B2

(12) United States Patent
Liu et al.

(10) Patent No.: US 12,749,044 B2
(45) Date of Patent: Sep. 29, 2026

(54) AUTOMATED FOODSTUFF SINGULATION SYSTEM

(71) Applicants: Wenbo Liu, Pascagoula, MS (US); Yuzhen Lu, East Lansing, MI (US); Yi Jing, Pascagoula, MS (US)

(72) Inventors: Wenbo Liu, Pascagoula, MS (US); Yuzhen Lu, East Lansing, MI (US); Yi Jing, Pascagoula, MS (US)

(73) Assignee: Mississippi State University, Mississippi State, MS (US)

( * ) Notice: Subject to any disclaimer, the term of this patent is extended or adjusted under 35 U.S.C. 154(b) by 370 days.

(21) Appl. No.: 18/627,175

(22) Filed: Apr. 4, 2024

(65) Prior Publication Data

US 2024/0338656 A1 Oct. 10, 2024

Related U.S. Application Data

(60) Provisional application No. 63/596,536, filed on Nov. 6, 2023, provisional application No. 63/494,159, filed on Apr. 4, 2023.

(51) Int. Cl.

*B07C 5/36* (2006.01)
*G06Q 10/087* (2023.01)
*B07C 5/342* (2006.01)

(52) U.S. Cl.

CPC ............ *G06Q 10/087* (2013.01); *B07C 5/342* (2013.01); *B07C 2501/0081* (2013.01)

(58) Field of Classification Search

CPC ...... G06Q 10/087; G06Q 50/12; B07C 5/342; B07C 2501/0081; B07C 5/36

See application file for complete search history.

(56) References Cited

U.S. PATENT DOCUMENTS 9,132,969 B2 9/2015 Greve
10,160,603 B2 12/2018 Musil (Continued)

FOREIGN PATENT DOCUMENTS

WO WO-2023014369 A1 * 2/2023 ............. G06T 15/20

OTHER PUBLICATIONS

Amit, S.K., Uddin, M., Rahman, R., Islam, S.M. and Khan, M.S., 2017. A review on mechanisms and commercial aspects of food preservation and processing. Agriculture & Food Security, 6(1), pp. 1-22.

(Continued)

*Primary Examiner* — Justin Holmes
(74) *Attorney, Agent, or Firm* — Conley Rose, P.C.

(57) ABSTRACT

Systems and methods for separating and orienting foodstuff using a tank of liquid, mechanical parts, machine vision, and artificial intelligence (AI) modeling. The system employs a tank comprising liquid, strategically placed liquid jets, and a lifting device with a grid plate. Foodstuff batches enter the tank. The submerged grid plate receives the foodstuff, and the liquid jets manipulate them inside the tank. Buoyancy and strategically directed liquid flow separate and orient the individual food items. A mechanical arm equipped with a gripper and other mechanical apparatus manipulates and transports the foodstuff outside the tank. AI models trained on image data depicting the singulation process are used. The AI model guides the system to achieve optimal separation and orientation of the foodstuff, resulting in individually separated and oriented foodstuff units.

20 Claims, 20 Drawing Sheets

(56) References Cited

U.S. PATENT DOCUMENTS

| | | | | |
|---|---|---|---|---|
| 11,632,961 | B2 | 4/2023 | Greve | |
| 2018/0208409 | A1* | 7/2018 | Zollitsch | B65G 47/905 |
| 2023/0054119 | A1* | 2/2023 | Pai | G06T 7/0004 |
| 2024/0330671 | A1* | 10/2024 | Komatireddi | G06N 3/08 |

OTHER PUBLICATIONS

Andrzej, M.L. and Krzysztof, H., Jul. 2016, Evaluation of ergonomic risk in the production line of frozen food products. In 2016 International Conference on Economics and Management Innovations (pp. 34-40). Atlantis Press.

Bennett, N.J., Finkbeiner, E.M., Ban, N.C., Belhabib, D., Jupiter, S.D., Kittinger, J.N., Mangubhai, S., Scholtens, J., Gill, D. and Christie, P., 2020. The COVID-19 pandemic, small-scale fisheries and coastal fishing communities. Coastal management, 48(4), pp. 336-347.

Bland, J.M., Bett?Garber, K.L., Li, C.H., Brashear, S.S., Lea, J.M. and Bechtel, P.J., 2018. Comparison of sensory and instrumental methods for the analysis of texture of cooked individually quick frozen and fresh?frozen catfish fillets. Food Science & Nutrition, 6(6), pp. 1692-1705.

Brown, D.E., Singh, R.P. and Coffelt, R.J., 1981. A System to Singulate and Align Squid for Packaging and Processing. Marine Fisheries Review, 43(6), pp. 21-26.

Chowdhury, P., Viraraghavan, T. and Srinivasan, A., 2010. Biological treatment processes for fish processing wastewater?A review. Bioresource technology, 101(2), pp. 439-449.

Eilertsen, A.B., 2012. Improved automated singulation of pelagic fish: Novel engineering and prior art construction—Design, Analysis and experiments (Master's thesis, NTNU).

El-Shafey, E.I., Gameiro, M.L.F., Correia, P.F.M. and Carvalho, J.D., 2004. Dewatering of brewer's spent grain using a membrane filter press: A pilot plant study. Separation Science and Technology, 39(14), pp. 3237-3261.

Fan, S.H., Chan, Y.C., Tang, C.W. and Lai, J.K.L., 2001. Aging studies of PBGA solder joints reflowed at different conveyor speeds. IEEE transactions on advanced packaging, 24(4), pp. 486-492.

Fantoni, G., Capiferri, S. and Tilli, J., 2014. Method for supporting the selection of robot grippers. Procedia CIRP, 21, pp. 330-335.

Fao, F., 2020. The state of world fisheries and aquaculture 2020. Sustainability in action. Rome. https://doi.org/10.4060/ca9229en, 224 pages.

Franklínsdóttir, H., 2014. Application of water jet cutting in processing of cod and salmon fillets (Master's thesis, University of Iceland), 90 pages.

Hatha, A.M., Paul, N. and Rao, B., 1998. Bacteriological quality of individually quick-frozen (IQF) raw and cooked ready-to-eat shrimp produced from farm raised black tiger shrimp (*Penaeus monodon*). Food Microbiology, 15(2), pp. 177-183.

Johnston, W.A., 1994. Freezing and refrigerated storage in fisheries (vol. 340). Food & Agriculture Org.

Joy, P. and Lada, R., 2006. Crack development in individually quick frozen cut and peel carrots. Journal of food science, 71(9), pp. E392-E397.

Laoprawatchai, P., Nov. 2019, The Case Study of Operation Frozen Food in Ranong. In International Academic Multidisciplinary Research Conference in Japan 2019 (pp. 198-205).

Liddel, M. and Yencho, M., 2021. Fisheries of the United States, 2019, 167 pages.

Love, D.C., Allison, E.H., Asche, F., Belton, B., Cottrell, R.S., Froehlich, H.E., Gephart, J.A., Hicks, C.C., Little, D.C., Nussbaumer, E.M. and da Silva, P.P., 2021. Emerging COVID-19 impacts, responses, and lessons for building resilience in the seafood system. Global Food Security, 28, p. 100494, 11 pages.

Nicolae, C.G., Bahaciu, G.V., Elia, E., Dumitrache, F., Marin, M.P., Pogurschi, E. and Badulescu, L., Jun. 2016, A review of the quality standards for frozen beef meat and fish. In The International Conference Agriculture for Life, Life for Agriculture of the University of Agronomic Sciences and Veterinary Medicine of Bucharest (pp. 302-307).

Tan, Y., Gao, H., Chang, S.K., Bechtel, P.J. and Mahmoud, B.S., 2019. Comparative studies on the yield and characteristics of myofibrillar proteins from catfish heads and frames extracted by two methods for making surimi-like protein gel products. Food chemistry, 272, pp. 133-140.

USDA United States Department of Agriculture. 2022. Catfish production reports from National Agricultural Statistics Service (NASS).

White, E.R., Levine, J., Moeser, A. and Sorensen, J., 2022. The direct and indirect effects of a global pandemic on US fishers and seafood workers. PeerJ, 10, p. e13007.

Xu, Y., Tong, X., Mao, Y., Griffin, W.B., Kannan, B. and DeRose, L.A., May 2014, A vision-guided robot manipulator for surgical instrument singulation in a cluttered environment. In 2014 IEEE International Conference on Robotics and Automation (ICRA) (pp. 3517-3523). IEEE.

Lasota, A., Hankiewicz, K., Evaluation of ergonomic rick in the production line of frozen food products. International Conference on Economics and Management Innovations (ICEMI 2016), pp. 272-278.

* cited by examiner

1300

1400

AUTOMATED FOODSTUFF SINGULATION SYSTEM

CROSS-REFERENCE TO RELATED APPLICATIONS

This patent application claims the benefit of U.S. Provisional Patent Application No. 63/494,159, filed Apr. 4, 2023 by Wenbo Liu, et al. and titled “Singulation System for Handling Fish” and U.S. Provisional Patent Application No. 63/596,536, filed Nov. 6, 2023 by Wenbo Liu, et al. and titled “Machine Learning Based Singulation System for Handling Fish,” which are hereby incorporated by reference.

STATEMENT REGARDING FEDERALLY SPONSORED RESEARCH OR DEVELOPMENT

This invention was made with government support by Mississippi Agricultural and Forestry Experiment Station (MAFES) Strategic Research Initiative (CRIS project #MIS-371210). The government has certain rights in the invention.

TECHNICAL FIELD

The present disclosure is generally related to methods and systems for processing food products. More specifically, the disclosure is related to post-processing methods, particularly via singulation, that are commonly used for foodstuff products.

BACKGROUND

Food processing involves various post-processing methods to prepare foodstuff products (e.g., meats, vegetables, fruits) for sale. An important aspect of post-processing is the separation of agglomerations or batches of foodstuff into individual pieces, which may require significant manual labor and costs, as well as be subject to human error. In addition, individual foodstuffs may need to be correctly positioned in order to prevent downtimes and reductions in productivity. Current food processing systems may not be adaptable for many types of foodstuff, and different kinds of foodstuff units may be damaged in existing systems. Improvements in the automation of foodstuff preparation processes may reduce labor demands and other issues associated with traditional foodstuff processing.

SUMMARY

In an embodiment, a singulation system is disclosed. The singulation system comprises a tank configured to contain a volume of a liquid. The singulation system further comprises a plurality of liquid jets coupled to the tank. The singulation system further includes a lifting device disposed within the tank. The lifting device comprises a grid plate. The singulation system further comprises a mechanical arm configured to be positioned above the tank. Additionally, the singulation system comprises a gripper coupled to the mechanical arm. The singulation system also comprises a machine vision system configured to control the mechanical arm and the gripper.

In an embodiment, a method for singulation foodstuff is disclosed. The method comprises releasing a batch of foodstuff into a tank. The tank comprises sidewalls and is configured to contain a volume of liquid. The liquid has a surface in the tank. The method further involves temporarily engaging a central rotary liquid jet to produce a horizontal liquid stream into the tank. The method also comprises lowering a lifting device comprising a grid plate into the tank to a predetermined depth under the surface of the liquid. The method further comprises selectively engaging and disengaging sidewall liquid jets to generate under-liquid streams in the liquid. Additionally, the method utilizes buoyant force and thrust force properties of the liquid in the tank to separate and manipulate the orientation of the batch of foodstuff, resulting in a plurality of separated foodstuff units.

In an embodiment, a non-transitory computer-readable medium comprising a computer program product for use by a singulation system is disclosed. The computer program product comprises computer-executable instructions stored on the non-transitory computer-readable medium such that when executed by a processor, it causes the singulation system to train an artificial intelligence (AI) model of a machine vision system to singulate foodstuff. Training of the AI model of the machine vision system comprises obtaining a training dataset comprising a plurality of images of input foodstuff and corresponding plurality of images of output foodstuff. Training the AI model of the machine vision system further comprises generating a plurality of candidate models with different architectures and parameters. For each candidate model, training the AI model of the machine vision system includes training the AI model on the training dataset and evaluating performance of the AI model on a validation dataset. Training the AI model of the machine vision system also comprises selecting a preferred-performing model from the plurality of candidate models based on performance evaluation of the AI model on a validation dataset. Additionally, training the AI model of the machine vision system comprises further training the preferred-performing model on a larger training dataset comprising the training dataset and additional data points.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
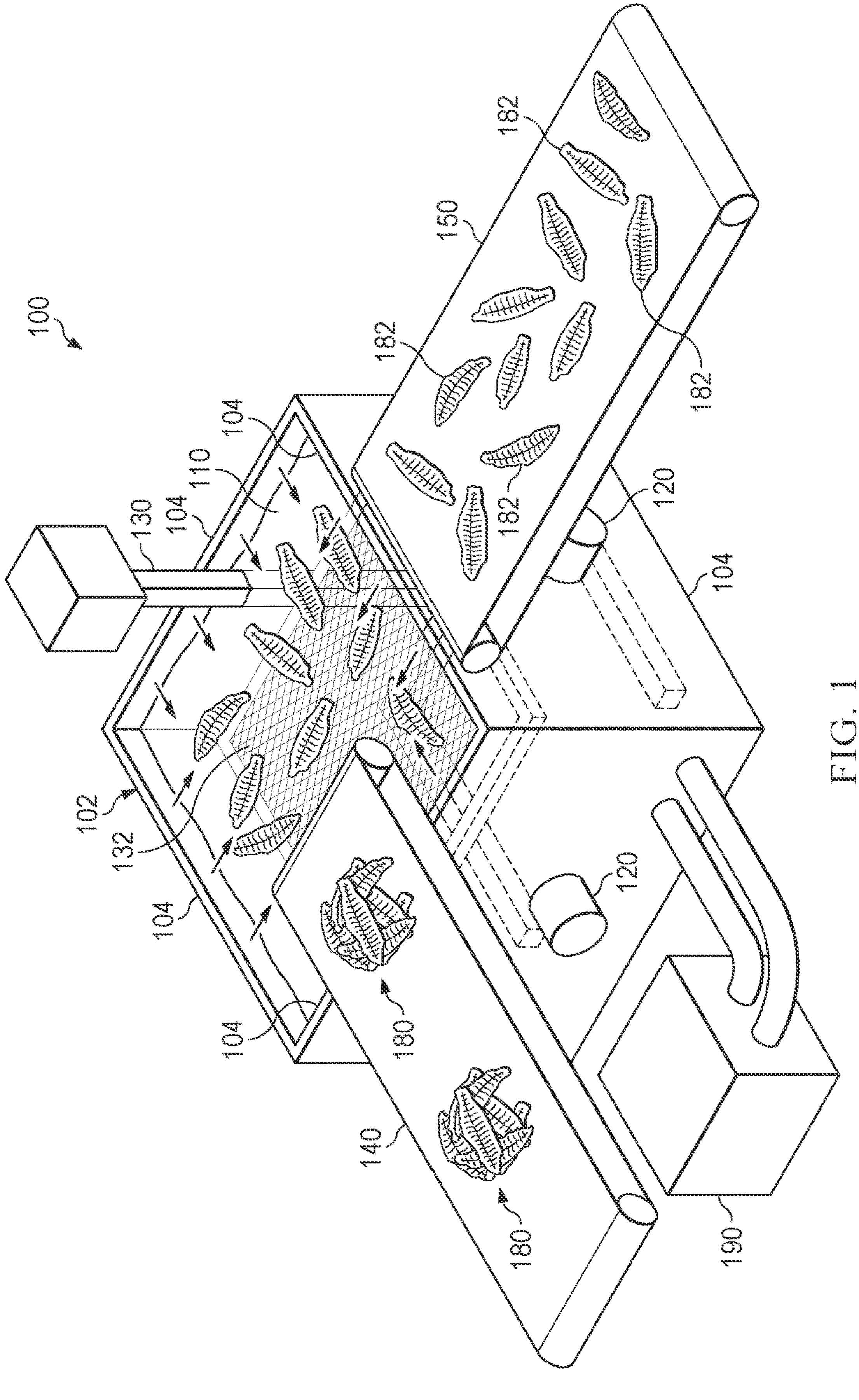
FIG. 1 is a schematic illustration of an example automated foodstuff singulation system.

It should be understood at the outset that although an illustrative implementation of one or more embodiments are provided below, the disclosed systems and/or methods may be implemented using any number of techniques, whether currently known or yet to be developed. The disclosure should in no way be limited to the illustrative implementations, drawings, and techniques illustrated below, including the exemplary designs and implementations illustrated and described herein, but may be modified within the scope of the appended claims along with their full scope of equivalents.

Foodstuff products (e.g., meats, vegetables, fruits, etc.) may be processed, marketed, and sold using various post-processing methods. Some post-processing methods include chilled for wet or dry packages, Individually Quick-Frozen (IQF) with ice glazed, and batter breading. For example, IQF is an instant freezing process that may be used to prepare various foodstuff products. IQF may inhibit large-size ice crystal formation in cells, which otherwise may cause damage to foodstuff membranes at the molecular level. IQF facilitates the preservation of high-quality food to a fair extent in terms of its original shape, color, smell, and taste. IQF aims to quick-freeze foodstuff products for direct human consumption without further industrial processing. As such, products kept in deep-frozen condition may maintain their qualities during transportation, storage, and distribution.

In the leadup to foodstuff post-processing (e.g., the preparation process before IQF), agglomerations (or batches) of foodstuff products may need to be separated into individual pieces or units, correctly oriented, and flattened. As an example, individual units of agglomerated foodstuff (e.g., a batch of fish fillets) may demand significant manual interference in the post-processing preparation process (e.g., IQF) in order to separate and orientate all products. This process may be labor-intensive, costly, and subject to human error. In addition to singulation (separation into individual pieces), the individual foodstuff units may need to be orientated (e.g., in the case of fish fillets, with head-on front and tail-on rear due to their long, thin shape). Otherwise, the different portions (e.g., tail section of fish fillets) may get stuck in the transportation mechanisms (e.g., gaps between conveyor belts or bed plates), causing downtimes and reductions in productivity.

Further, the top and bottom orientations of foodstuff may affect freezing quality in the IQF process. With improper orientation (e.g., fish fillet facing inside down), frozen foodstuff may stick to transportation mechanisms. Removing such trapped foodstuff from these transport mechanisms can lead to unacceptable yield losses. Therefore, it may be beneficial to orient foodstuff prior to post-processing and resale correctly. In addition to the singulation process, foodstuff orientation adjustment may also require great manual efforts, further increasing the labor costs for foodstuff processing. Example singulation systems may not be adaptable for many types of foodstuff. For example, high-speed conveyor belt systems and rotary singulators alone cannot manage orientation operations to particular kinds of foodstuff. Furthermore, due to differing textures, different types of foodstuff units may be damaged in existing systems, such as clocking systems, vibration feeders, and pick-and-place systems. Thus, improvements in the automation level of foodstuff preparation processes may reduce labor demands associated with foodstuff processing.

Additionally, the food processing industry may utilize computer vision technology for various tasks. These techniques may offer rapid and accurate assessment of foodstuff attributes with minimal preparation, potentially reducing labor costs and enhancing product quality. Advancements in computing power and processing speeds may further enable the development of technologies tailored to real-world production needs.

While computer vision has been implemented in foodstuff production tasks, like species recognition and yield prediction, its application for orientation and segmentation of foodstuff, particularly fish fillets, remains less explored. Such limited focus may present challenges, as certain types of foodstuff may pose unique visual complexities in segmentation and detection. Firstly, accurately identifying and tracking the contours of the various foodstuffs may be difficult due to the irregular shapes and textures of foodstuffs. Secondly, differentiating between folded and stacked foodstuff may present another significant visual hurdle. Folded or stacked configurations during processing may complicate the handling and processing of these foodstuff items.

Image segmentation, a computer vision task, may divide an image into distinct regions with meaning. Such image segmentation may encompass various types, including semantic segmentation (classifying pixels by labels), instance segmentation (separating individual objects), and panoptic segmentation (a combination of classifying pixels by labels and separating individual objects). This disclosure more specifically discusses instance segmentation in identifying individual foodstuff items within an image, particularly regarding foodstuff orientation and folded/unfolded states.

Deep learning methods may be a part of image segmentation tasks. A deep learning model derived from the transformer network family, such as SegFormer (and its variants B0, B1, B2, B3, B4, and B5), may help balance efficiency, accuracy, and robustness in segmentation tasks. The You Only Look Once version 8 (YOLOv8) deep learning model may demonstrate strong performance and flexibility in both object detection and instance segmentation. Other deep learning models have explored object detection in foodstuff processing (e.g., the You Only Look Once version 3 (YOLOv3) model has segmented various parts of fish heads and tails with a mean average precision (mAP) of around 80% and 73%, respectively). However, specific segmentation of foodstuff items to determine orientation and separation has generally remained underexplored—most notably among those, models applying SegFormer-B5 (a SegFormer model variant) and YOLOv8 for segmenting foodstuff for automated singulation purposes.

Disclosed herein are methods and systems for automating foodstuff processing, particularly singulation, for postharvest processing efficiency. The systems and methods utilize properties of liquid buoyancy and under-liquid streams, along with engineering design, prototyping, and machine vision technology to automate the singulation and orientation process of foodstuff. As discussed earlier, example singulation technologies often rely on conveyor systems, robotic pick-and-place mechanisms, or the application of vibration or centrifugal forces. In contrast, this disclosure leverages liquid, such as water, as a safe and reliable medium for handling and singulating foodstuffs.

More particularly, the systems and methods for separating and orienting foodstuff may utilize a tank filled with liquid, strategically placed liquid jets, and a lifting device with a grid plate. First, a batch of foodstuff may enter the tank. A submerged grid plate on a lifting device may then receive the foodstuff. A central rotary liquid jet, which may be positioned above the tank, may briefly create a horizontal liquid stream to aid in the initial separation of foodstuff. Next, the lifting device with the foodstuff may lower further into the tank. Jets positioned on the tank walls may then be turned on and off in a specific manner to create controlled liquid flows under the surface. By using the natural buoyancy and thrust force of liquid streams, the system may separate and position the individual foodstuff units.

This disclosure further presents machine vision-based automation with regard to foodstuff singulation. This system may implement deep learning models for the recognition of foodstuff orientation and separation. As such, this system may also incorporate an artificial intelligence (AI) model to enhance performance. The AI model may be trained on image data, documenting the pictures of foodstuff before they enter the tank and pictures of foodstuff units after they are separated and oriented. The AI model may analyze real-time images captured by the machine vision system and may use its knowledge to guide the system in optimizing the separation and orientation of foodstuff.

Additionally, the present disclosure supports the development of custom singulation and unfolding systems, dewatering, flipping, and turning systems, and design guidelines comprising engineering theories, scaling laws, and predictive models. These outcomes may facilitate the automated preparation for post-processing foodstuff. The present disclosure can be applied to various types of foodstuff, including but not limited to meats (e.g., chicken, beef, or fish species such as catfish, salmon, cod, tilapia, etc.), as well as other foodstuff (e.g., fruits, vegetables, etc.). The disclosed systems and methods may employ sinking and lifting processes within liquid—that is, the manipulation of buoyancy forces in liquid—to separate and orient foodstuffs without causing damage. Additionally, targeted air jets may be employed for dewatering purposes, minimizing liquid absorption during the process. Dewatering may be seen as a broad term used in various contexts, but generally involves techniques to separate liquids (e.g., water) from solids or semi-solids.

An embodiment of a singulation system may comprise a tank, a plurality of liquid jets, a lifting device, a mechanical arm, a gripper, and a machine vision system. The tank may be configured to contain a volume of liquid. The liquid may be water or any other liquid suitable for foodstuff processing. The tank may comprise sidewalls. The plurality of liquid jets may be coupled to the tank. The lifting device may comprise a grid plate, which may be disposed within the tank. The mechanical arm may be configured to be positioned above the tank. The gripper may be coupled to the mechanical arm. The machine vision system may be configured to control the mechanical arm and the gripper.

In an embodiment of the singulation system, the liquid jets may comprise a central rotary liquid jet and one or more sidewall liquid jets. The plurality of liquid jets may be configured to generate variable horizontal and vertical streams that engage with a batch of foodstuff to separate the batch of foodstuff into a plurality of individual foodstuff units and orient the individual foodstuff units to a predetermined orientation. The central rotary liquid jet may be configured to be positioned above the tank and configured to produce a horizontal liquid stream into the tank. The horizontal stream of liquid produced by the central rotary liquid jet may be capable of covering a rotational area from 0° to 360°. The one or more sidewall liquid jets may be affixed to the sidewalls of the tank. Sidewalls may comprise any interior surfaces of the tank, including the bottom of the tank.

In an embodiment, the singulation system may further comprise transport mechanisms. The transport mechanisms may comprise an input mechanism and an output mechanism. The input mechanism may be disposed to transport a plurality of foodstuff batches downstream into the tank. The output mechanism may be disposed to transport individually separated and oriented foodstuff units downstream away from the tank. The transport mechanisms (e.g., the input mechanism and the output mechanism) may be conveyors. As an example, the input mechanism may be an input conveyor disposed to transport a plurality of foodstuff batches downstream into the tank, and the output mechanism may be an output conveyor disposed to transport individually separated and oriented foodstuff units downstream away from the tank.

In an embodiment of the singulation system, the machine vision system may comprise a camera and a non-transitory computer-readable medium with stored instructions. The camera may be configured to capture and transmit images of foodstuff arrangements. The non-transitory computer-readable medium with stored instructions may comprise an artificial intelligence (AI) model configured to detect, localize, and categorize foodstuff arrangement from images of foodstuff captured and transmitted from the camera. The non-transitory computer-readable medium with stored instructions may be configured to inspect and grade foodstuff separation and orientation.

In an embodiment, the singulation system may further comprise a dewatering, flipping, and turning system. The dewatering, flipping, and turning system may include an air blower and a plurality of rotating paddles. The air blower may be configured to dewater foodstuff, either wholly or partly (e.g., ejecting a percentage of liquid from foodstuff). Used in various contexts, the terms "dewater" or "dewatering" may refer to the process of removing any liquid (i.e., not only water) from foodstuff in instances or, more generally, may involve techniques to separate liquids from solids or semi-solids. Dewatering foodstuff via the air blower may aid in minimizing liquid-absorbing effects in foodstuff due to sinking lifting processes. The plurality of rotating paddles may be configured to flip and turn incorrectly oriented foodstuff units. The air blower and the plurality of rotating paddles may be positioned adjacent to an output mechanism that is disposed to transport individually separated foodstuff units downstream away from the tank.

In an embodiment, the singulation system may further comprise a liquid renewal system. Due to frequent sinking and lifting processes, the quality and cleanliness of liquid may be degraded, particularly if foodstuff leaves behind debris (e.g., catfish fillets may leave behind residual mucus, blood, algae, and mud inside the tank). A liquid renewal system may be employed to minimize liquid degradation. This liquid renewal system may not only aid in improving the cleanliness of liquid and foodstuff to be singulated but also may aid in maintaining constant liquid temperature in the tank. Such a system may engage various existing parts of the singulation system, such as liquid jets (including the central rotary liquid jet and the sidewall liquid jets) and the lifting device (including grid plate) along with the buoyancy properties of liquid and under-liquid streams to function, to breakdown debris and improve cleanliness of the liquid. Thus, this liquid renewal system may aid in enhancing the cleanliness of liquid and foodstuff in the tank.

In an embodiment of the singulation system, there may be a plurality of mechanical arms and a plurality of grippers coupled to the mechanical arms instead of a single mechanical arm and a single gripper. Grippers may be vacuum grippers or other mechanisms suitable for suctioning, gripping, or otherwise picking up foodstuff units.

An embodiment of a method for singulating foodstuff may comprise releasing a batch of foodstuff into a tank. The tank may comprise sidewalls and be configured to contain a volume of liquid. The liquid may have a surface in the tank. The liquid comprised in the volume of liquid may be water or any other liquid appropriate for foodstuff processing. The batch of foodstuff may comprise different weights and quantities of foodstuff to be singulated. The method may comprise temporarily engaging a central rotary liquid jet to produce a horizontal stream of liquid into the tank. The horizontal stream of liquid produced by the central rotary liquid jet may be capable of covering a rotational area from 0° to 360°. The central rotary liquid jet may perform several rotational motions while producing the horizontal stream of liquid used to separate and spread the batch of foodstuff.

The method may further comprise lowering a lifting device comprising a grid plate into the tank to a predetermined depth under the surface of the liquid. The lifting device comprising the grid plate may aid in the realization of singulation by varying sinking and lifting motion and speed. The predetermined depth under the surface of the liquid may place the grid plate at a depth relative to the surface of the liquid in the tank or relative to affixed sidewall liquid jets. The grid plate may be initially placed at or near the bottom of the tank and lifted out of the liquid with varying lifting speeds. The method may comprise selectively engaging and disengaging sidewall liquid jets to generate under-liquid streams in the liquid. Selective engagement of the sidewall liquid jets may correspond to certain areas where further singulation (unfolding and separation) of the batch of foodstuff is desired. The under-liquid streams generated by sidewall liquid jets may vary in pressure and direction. The method may utilize the buoyant force and thrust force properties of the liquid in the tank to separate and manipulate the orientation of the batch of foodstuff, resulting in a plurality of separated foodstuff units.

In an embodiment, the method for singulating foodstuff may comprise engaging the lifting device comprising the grid plate in the tank to lift the plurality of separated foodstuff units out of the liquid. The method may comprise performing image acquisition of the plurality of separated foodstuff units by a machine vision system. The method may comprise inspecting images, by the machine vision system, of the plurality of separated foodstuff units to determine whether one or more of the plurality of separated foodstuff units meet a threshold singulation percentage and a threshold unfold percentage. When separated foodstuff units meet the threshold singulation percentage and the threshold unfold percentage, the method may comprise using the gripper to drag separated foodstuff units to an output mechanism. In an embodiment of the method, the grippers may be used when a predetermined singulation completion percentage for singulating the batch of foodstuff has been achieved. It should be noted that singulation completion percentage may be a percentage measurement of the amount of singulation of an entire batch of foodstuff, whereas unfold percentage and singulation percentage may refer to percentage measurements of individually separated foodstuff units.

Image acquisition and inspection may be performed by employing a camera and a non-transitory computer-readable medium comprising a computer program product comprising computer-executable instructions that, when executed, train an AI model of the machine vision system. For example, initially, a quantity of foodstuff units may be positioned in the camera's center field of view. Images of randomly dispersed orientations of foodstuff may be acquired once a satisfactory variety of orientations are observed. A camera may be aligned vertically downwards. The image capture environment may be adjusted to reduce possible light reflections from surroundings (e.g., liquid, etc.). The camera's exposure and focus may be calibrated, ensuring distinct visibility and pronounced contrast of the foodstuff against a background. Calibration may consider ambient lighting conditions and the distance between the camera and the foodstuff. To improve clarity and recognition of complex textures of foodstuff, imaging settings may be fine-tuned until foodstuff appears clear and sharp in a monitor. During each imaging session, data from the quantity of foodstuff units may be recorded. Images may be captured of foodstuff units out-of-liquid and under-liquid. A desired amount of images may be gathered (e.g., 400 images—200 images of out-of-liquid foodstuff units and 200 images of under-liquid foodstuff units). The under-liquid images may serve the purpose of assessing singulation performance and controlling for the operations of the central rotary liquid jet and sidewall liquid jets. On the other hand, the images taken outside the liquid may be used to identify the separated, flattened, and correctly oriented foodstuff units. The distribution and orientation of the foodstuff units in each image may be randomized to simulate an actual singulation process. Such image acquisition may eventually lead to a dataset with a number of images (e.g., 400 images, as discussed earlier) that may be categorized.

In an embodiment, before releasing the batch of foodstuff into the tank, the method for singulating foodstuff may comprise loading the batch of foodstuff on an input mechanism and transporting the batch of foodstuff on the input mechanism to the tank. In an embodiment, after releasing the batch of foodstuff into the tank and before temporarily engaging a central rotary jet to produce a horizontal stream of liquid into the tank, the method for singulating foodstuff may comprise receiving, by the lifting device comprising the grid plate submerged in the liquid at an initial predetermined depth (e.g., 2-3 cm) under the surface of the liquid, the batch of foodstuff. The grid plate may be initially placed at or near the bottom of the tank and lifted out of the liquid with varying lifting speeds. The batch of foodstuff may be moved and separated under the liquid, utilizing its buoyancy properties.

In an embodiment of the method for singulating foodstuff, using the gripper may further comprise engaging the gripper to pick up the one or more separated foodstuff units and disengaging the gripper to drop the one or more separated foodstuff units onto an output mechanism. This may be done, for instance, to transport one or more separated foodstuff units to a dewatering, flipping, and turning system and eventually to an output mechanism. In an embodiment, the method may comprise utilizing a liquid renewal system to clean the liquid in the tank.

In an embodiment of the method for singulating foodstuff, the machine vision system may be trained using an artificial intelligence (AI) training model. An embodiment of utilizing a non-transitory computer-readable medium for training an AI model of a machine vision system to singulate foodstuff may be executed by a processor. The non-transitory computer-readable medium may comprise a computer program product for use by a singulation system that may be utilized in training the machine vision system on the AI model. The computer program product may comprise computer-executable instructions stored on the non-transitory computer-readable medium such that when executed by a processor, it may cause the singulation system to train the AI model of the machine vision system to singulate the foodstuff by, first, obtaining a training dataset comprising a plurality of images of input foodstuff and corresponding plurality of images of output foodstuff. Then, the AI training model may generate a plurality of candidate models with different architectures and parameters. For each candidate model, the method for training the AI model may comprise training the AI model on the training dataset and evaluating performance of the AI model on a validation dataset. The AI training model may comprise selecting a preferred-performing model from the plurality of candidate models based on performance evaluation of the AI model on a validation dataset.

In an embodiment of the AI training model, a plurality of images of input foodstuff may further comprise a plurality of images of under-liquid foodstuff and a plurality of images of out-of-liquid foodstuff. The plurality of images of under-liquid foodstuff may be used to assess singulation performance and selectively control operations of a central rotary liquid jet and one or more sidewall liquid jets. The plurality of images of out-of-liquid foodstuff may be used to identify correctly separated and oriented foodstuff. The plurality of images may be randomized to simulate a singulation process. Referring back to how image acquisition may be performed (supra) in an embodiment, such image acquisition may eventually lead to a dataset with a number of images (e.g., 400 images as discussed above) that may be grouped into categories.

In an embodiment of the AI training model, the plurality of images of input foodstuff and the plurality of images of output foodstuff may be grouped into categories. The categories may comprise an Unfold category, an UnfoldAggregation category, a Fold category, and an Aggregation category. The Unfold category may comprise images of foodstuff units that are correctly separated from other foodstuff units or batches of foodstuff and correctly oriented for later processing. The UnfoldAggregation category may comprise images of foodstuff units that are adjacent to and not separated from other foodstuff units or batches of foodstuff, but are otherwise correctly oriented. The Fold category may comprise images of individual foodstuff units that are folded upon themselves but are otherwise correctly separated from other foodstuff units or batches of foodstuff. The Aggregation category may comprise images of individual foodstuff that are stacked upon and not correctly separated from other foodstuff units or batches of foodstuff.

In an embodiment of the AI training model, the Unfold category and the UnfoldAggregation category may not require further manipulation operations for later processing. Relatedly, the Fold category and the Aggregation category may require further manipulation operations by a singulation system to be correctly separated and correctly oriented.

In an embodiment, the AI training model of the machine vision system may adjust for drop-down height and lifting speeds of a lifting device with a grid plate, batch size of a batch of foodstuff, batch weight of the batch of foodstuff, and numbers, locations, power outputs, and frequency of liquid jets.

In an embodiment, the AI training model of the machine vision system may examine and compare multiple linear regression models to determine the effects of control parameters, determine effects for various production scales, predict singulation and unfolding performance, and estimate batch sizes and related processing speeds.

In an example, the AI training model process may initiate with the acquisition of original images. During an image annotation phase, these images may be annotated with polygonal boundaries to capture the unique shapes and orientations of foodstuff units. These annotations may provide a robust representation of each foodstuff unit, enhancing the accuracy of model training. Once annotated, the images may be exported to distinct formats (e.g., YOLOv5 PyTorch format (a format that combines the object detection capabilities of YOLOv5 with the development and training environment offered by PyTorch, an open-source deep learning framework used for developing and training neural networks), JavaScript Object Notation (JSON) format, Semantic Segmentation Mask format, and Portable Network Graphics (PNG) format). The justification for using different formats may lie in their respective applications. For example, the YOLOv8 instance segmentation utilizes the JSON format to identify individual foodstuff units, discerning their unique shapes and positions. On the other hand, the SegFormer-B5 semantic segmentation employs the PNG format to understand the broader categories of foodstuff unit orientations, offering a more generalized view of the foodstuff unit types. Together, the different segmentation methods may provide a holistic approach to foodstuff detection and categorization.

To assess the performance of SegFormer-B5, the Intersection over Union (IoU) measure may be used. This IoU measurement may be computed as the ratio between the intersection and the union of the "predicted mask" and the "ground-truth mask"

$$\left(IoU = \frac{|A \cap B|}{|A \cup B|}\right).$$

Moreover, mean Intersection over Union (mIoU) may offer an average of the IoU scores across all classes in each dataset $$\left(mIoU = \frac{1}{k+1}\sum_{i=0}^{k} IoU_i\right).$$

A and B may represent the "predicted mask" and "ground-truth mask" corresponding to all category instances in the current image, respectively. And mIoU may be obtained by summing the IoU values for each class from 0 to k (e.g., for four categories, k is 3) and dividing by the total number of classes (k+1). To evaluate YOLOv8's performance, the average precision (AP) may be calculated using precision (P) and recall (R) at an Intersection over Union (IoU) threshold of 50%. Precision, defined as the ratio of true positives (TP) to the sum of TP and false positives (FP), may indicate the model's accuracy in identifying true positive masks. The ratio of TP to the sum of TP and false negatives (FN) may gauge the model's capability to detect positive instances within the dataset using masks. Both metrics may be determined by comparing predicted masks to ground truth annotations.

Furthermore, to provide a comprehensive assessment, the mean Average Precision (mAP) may be used. mAP is a summary metric that averages the AP across various IoU thresholds. Specifically, two scenarios may be considered: a single IoU threshold of 50% and an average over multiple thresholds ranging from 50% to 95%. While an IoU of 50% may indicate a relatively loose overlap between the predicted masks and ground truth, higher thresholds may demand a tighter match. By considering these varied thresholds, mAP may offer a more robust evaluation, emphasizing the model's overall proficiency in mask predictions across diverse conditions. The mAP for all categories of foodstuff unit orientation may be calculated using the equation:

$$mAP = \frac{1}{N}\sum_{i=1}^{N} AP_i,$$

where $AP_i$ represents the AP value for an individual category (i=1, 2, 3, 4). As a primary metric in multi-class instance segmentation, mAP may be evaluated for various IoU thresholds (e.g., ranging from 0.50 to 0.95 with a 0.05 step size—mAP may also be calculated when the IoU threshold is set to 0.5). Thus, more than one IoU threshold (e.g., mAP@0.5 and mAP@[0.5:0.95]) may be reported for YOLOv8 performance evaluation.

The following table summarizes overall detection results of foodstuff units under the test set using YOLOv8 in two conditions (i.e., out-of-liquid and under-liquid) and four foodstuff orientation categories (i.e., Unfolded, Unfolded-Aggregated, Folded, and Aggregated):

(e.g., size, thickness, texture, etc.) from different batches may exacerbate these concerns. Additional dataset expansion for model training may need to be gathered. Using images from real-world production environments to augment model training may allow for a wider range of applicability of model prediction capabilities.

FIG. 1 illustrates an example automated foodstuff singulation system 100. Automated foodstuff singulation system 100 may comprise tank 102, a volume of liquid 110, liquid jets 120, lifting device 130, grid plate 132, input mechanism 140, and output mechanism 150. Tank 102 may be of any three-dimensional shape and made of any material that may be configured to contain volume of liquid 110. Tank 102 may comprise sidewalls 104. Sidewalls 104 may comprise any interior surfaces of tank 102, including the bottom of tank 102. Liquid comprised in volume of liquid 110 may be water or any other liquid suitable for foodstuff processing. Liquid jets 120 may be coupled to tank 102. Liquid jets 120 may be positioned in various locations, for example, overhead tank 102, at the bottom of tank 102, or adjacent to other liquid jets. Liquid jets 120 may be comprised of an outlet coupled to liquid source and capable of supplying a pressurized stream of water to manipulate foodstuff within liquid 110. Lifting device 130 may be disposed within tank 102 and may comprise grid plate 132.

Automated foodstuff singulation system 100 may be utilized by transporting a batch of foodstuff 180 on input mechanism 140 into tank 102 to perform foodstuff singulation. Batch of foodstuff 180 may comprise foodstuff of various types, including but not limited to, meats, fruits, and vegetables. Performing foodstuff singulation processes may result in a plurality of separated foodstuff units 182. Liquid jets 120 may be configured to generate variable horizontal and vertical streams that engage with batch of foodstuff 180 to separate the batch of foodstuff 180 into a plurality of individual foodstuff units 182 and orient the individual foodstuff units 182 to a predetermined orientation. Input mechanism 140 and output mechanism 150 may be conveyors. For example, input mechanism 140 may be an input conveyor disposed to transport a plurality of foodstuff batches downstream into tank 102, and output mechanism 150 may be an output conveyor disposed to transport individually separated and oriented foodstuff units 182 downstream away from tank 102.

| | Out-of-water | | | | Underwater | | | |
|---|---|---|---|---|---|---|---|---|
| Category | Precision (Mask) | Recall (Mask) | mAP @0.5 (Mask) | mAP @[0.5:0.95] (Mask) | Precision (Mask) | Recall (Mask) | mAP @0.5 (Mask) | mAP@[0.5:0.95] (Mask) |
| All | 93.7% | 96.2% | 97.4% | 95.5% | 99.5% | 96.1% | 97.1% | 92.7% |
| Fold | 100% | 94.4% | 98.1% | 95.8% | 96.8% | 97.5% | 98.2% | 90.3% |
| Unfold Aggregation | 82.4% | 95.2% | 95.7% | 93.1% | 90.6% | 93.9% | 94.0% | 90.3% |
| Unfold | 99.3% | 100% | 99.5% | 98.2% | 98.3% | 97.9% | 98.3% | 94.3% |
| Aggregation | 92.9% | 95.3% | 96.1% | 94.9% | 96.3% | 95.0% | 97.6% | 96.1% |

Because actual under-liquid foodstuff unit observations may be negatively affected by liquid reflectance, fluctuation, and turbidity, the out-of-liquid predictions with the test set may generally achieve better results than under-liquid.

Generally, the unpredictable movement of foodstuff in a liquid tank with various liquid properties (e.g., current, buoyancy, etc.) may complicate the singulation process. Occlusion and overlap are issues that may affect detection accuracy. Additionally, variations in foodstuff properties Automated foodstuff singulation system 100 may be utilized to maintain the cleanliness of liquid 110 utilized in automated foodstuff singulation system 100. Due to frequent sinking and lifting processes, the quality and cleanliness of liquid 110 may be degraded, particularly if foodstuff leaves behind debris (e.g., catfish fillets may leave behind residual mucus, blood, algae, and mud inside). To minimize liquid degradation effects, liquid renewal system 190 may be employed to ensure cleanliness of liquid and foodstuff to be singulated. Liquid renewal system 190 may be located and controlled entirely internally within tank 102 or may be externally located and controlled (as depicted). Liquid renewal system 190 may also aid in maintaining constant liquid temperature in tank 102. Such a system may utilize various parts of automated foodstuff singulation system 100, such as liquid jets 120 and lifting device 130, to breakdown debris and improve cleanliness of liquid 110.

In an embodiment, a user may place a batch of foodstuff 180 onto input mechanism 140. The input mechanism 140 may convey batch of foodstuff 180 into tank 102 for singulation. Batch of foodstuff 180 may be released into tank 102. Liquid jets 120 may be temporarily engaged and disengaged to initiate separating batch of foodstuff 180. Lifting device 130 comprising grid plate 132 may be lowered into tank 102 to a predetermined depth under the surface of liquid 110. By varying sinking and lifting motion and speed of lifting device 130, singulation may be further realized. Batch of foodstuff 180 in tank 102 may be further manipulated by engaging and disengaging select liquid jets 120 to aid in separating batch of foodstuff 180 to resultant individual foodstuff units 182. Buoyant force and thrust force properties of liquid 110 may be utilized in tank 102 to separate and manipulate the orientation of batch of foodstuff 180, resulting in a plurality of separated foodstuff units 182 that may be transported on output mechanism 150.

Figure 2A:
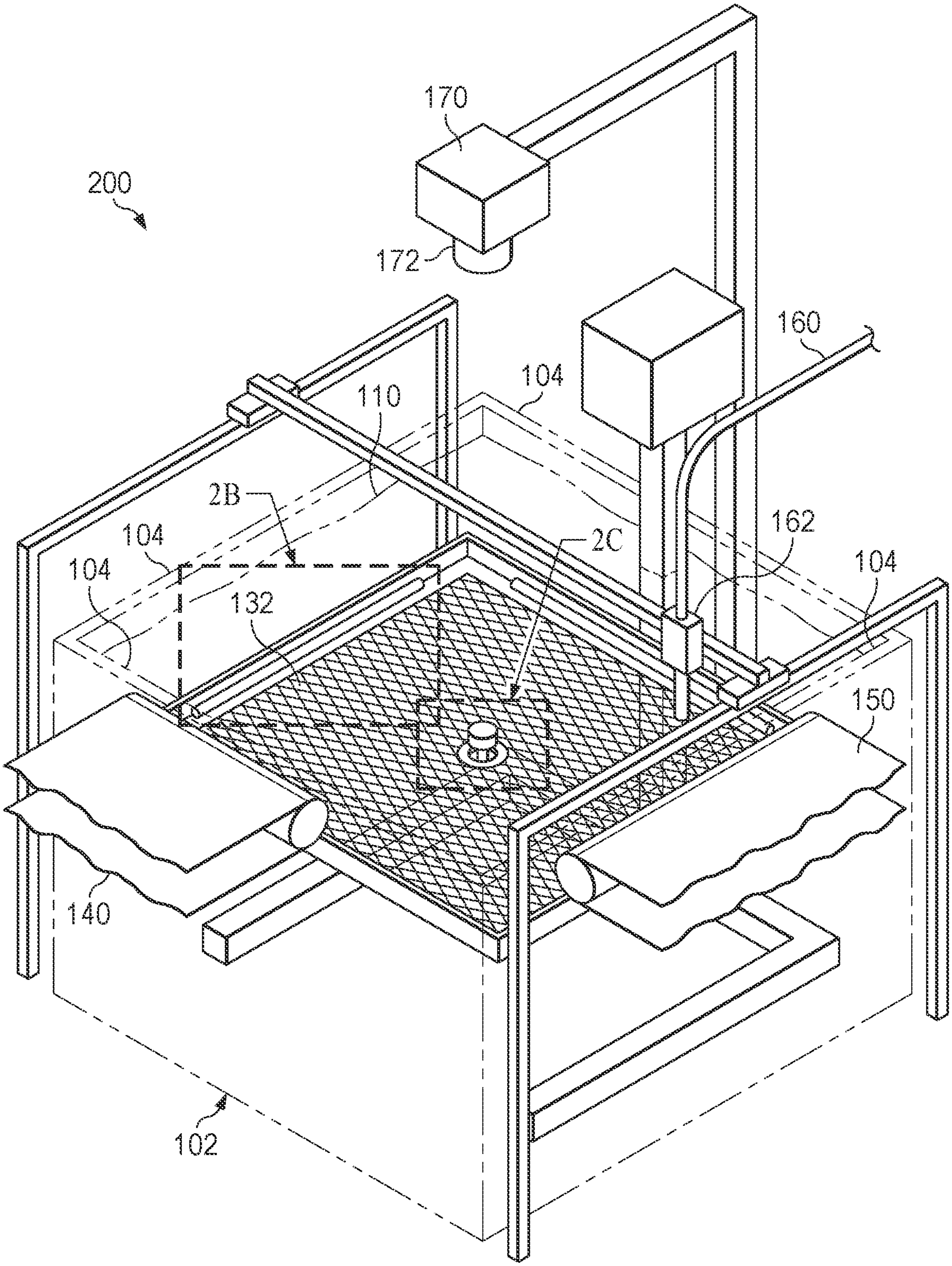
FIGS. 2A, 2B, 2C, and 2D are graphical illustrations of an example automated foodstuff singulation system.
Figure 2B:
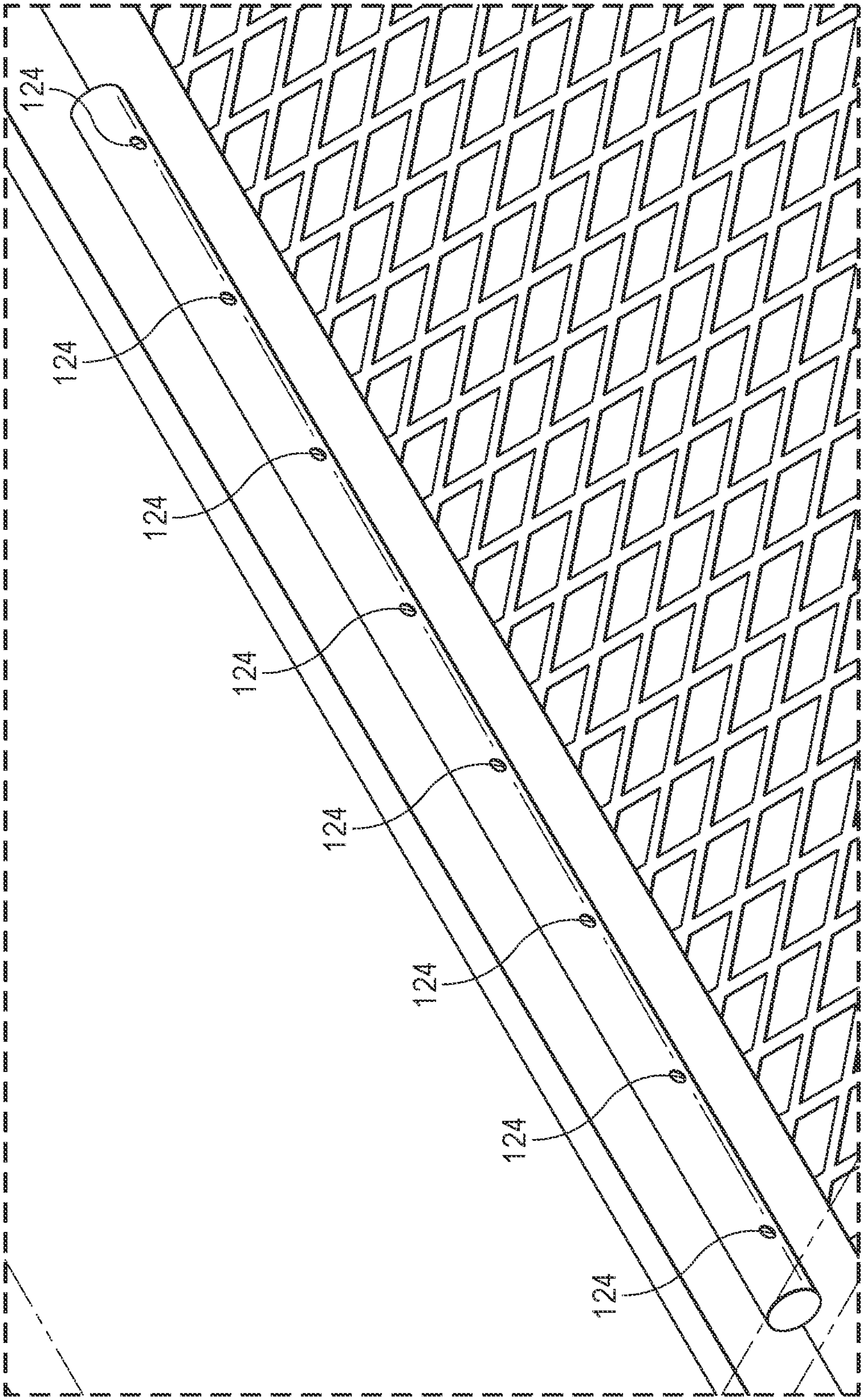
Figure 2C:
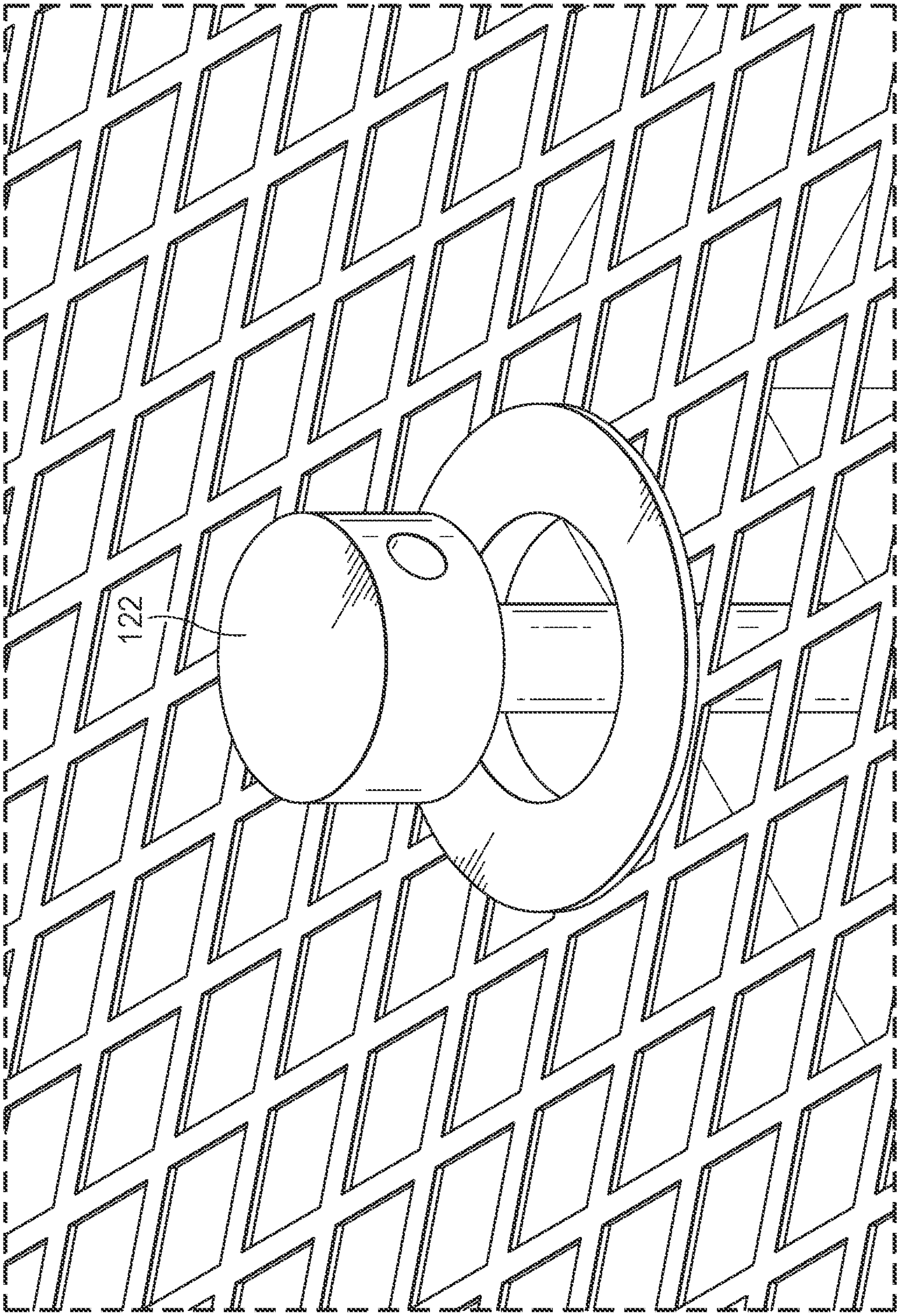
Figure 2D:
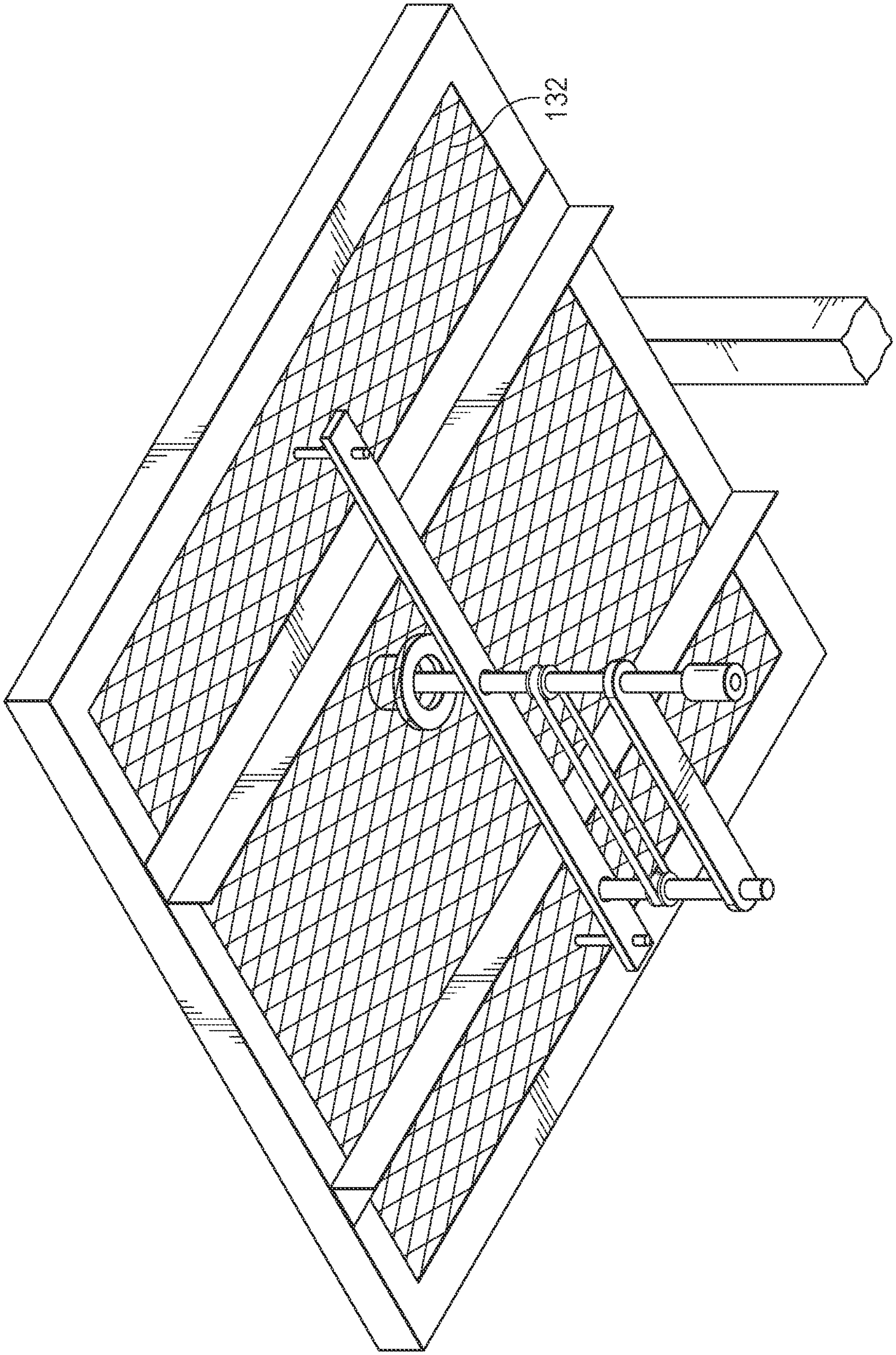

FIGS. 2A, 2B, 2C, and 2D illustrate additional components 200 of example automated foodstuff singulation system 100. Components 200 may comprise parts substantially similar to parts in FIG. 1. As shown in FIG. 2A, additional components 200 may include mechanical arm 160, gripper 162, and machine vision system 170. Mechanical arm 160 may be configured to be positioned above tank 102. Gripper 162 may be coupled to mechanical arm 160. Gripper 162 may be a vacuum gripper or other mechanism suitable for suctioning, gripping, or otherwise picking up foodstuff units 182 (shown in FIG. 1). Machine vision system 170 may comprise camera 172 and be configured to control mechanical arm 160 and gripper 162. Camera 172 may be utilized to detect orientation and separation properties of batch of foodstuff 180 or foodstuff units 182 (shown in FIG. 1). As shown in FIGS. 2B, 2C, and 2D, depicting zoomed-in aspects of additional components 200, liquid jets 120 may comprise a central rotary liquid jet 122 and sidewall liquid jets 124. Central rotary liquid jet 122 may be configured to be positioned above tank 102 or emerge from below (as depicted in FIGS. 2C and 2D) grid plate 132 (shown in FIG. 1). Central rotary liquid jet 122 may be configured to produce a horizontal liquid stream into tank 102. Sidewall liquid jets 124 may be affixed to sidewalls 104 of tank 102 as individual units or as a series of openings on a single jet (as depicted in FIG. 2B). Sidewalls 104 may comprise or be located on any interior surfaces of tank 102, including the bottom of tank 102.

In an embodiment, utilizing liquid jets 120 may comprise utilizing central rotary liquid jet 122 and sidewall liquid jets 124. Before lowering lifting device 130 grid plate 132 into tank 102 to a predetermined depth under the surface of liquid 110, central rotary liquid jet 122 may be temporarily engaged to produce a horizontal stream of liquid into tank 102. The horizontal stream of liquid may perform several rotational motions while producing the horizontal stream of liquid used to separate and spread batch of foodstuff 182. After lowering lifting device 130 grid plate 132 into tank 102 to a predetermined depth under the surface of liquid 110, sidewall liquid jets 120 may be selectively engaged and disengaged to generate under-liquid streams in liquid 110 corresponding to certain areas where further singulation of batch of foodstuff 180 may be required. Before actions associated with central rotary liquid jet 122 and sidewall liquid jets 124 are engaged, lifting device 130 comprising grid plate 132 into tank 102 may be initially submerged in liquid 110 at an initial predetermined depth under the surface of liquid 110, and batch of foodstuff 180 may initially be received at the initial predetermined depth.

As discussed above, batch of foodstuff 180 is singulated in tank 102, resulting in a plurality of individual foodstuff units 182. In an embodiment, lifting device 130 comprising grid plate 132 may be engaged to lift singulated foodstuff units 182 out of liquid 102. Machine vision system 170 may be configured to employ camera 172 to view foodstuff and determine if foodstuff is sufficiently singulated and correctly oriented enough to be determined individual foodstuff units 182. If foodstuff is determined to be sufficiently singulated and correctly oriented individual foodstuff units 182, gripper 162 can be used to drag foodstuff units 182 to output mechanism 150. Using gripper 162 to drag separated foodstuff units 182 to output mechanism 150 may involve engaging gripper 162 to pick up foodstuff units 182 and disengaging gripper 162 to drop foodstuff units 182 onto output mechanism 150.

Figure 3:
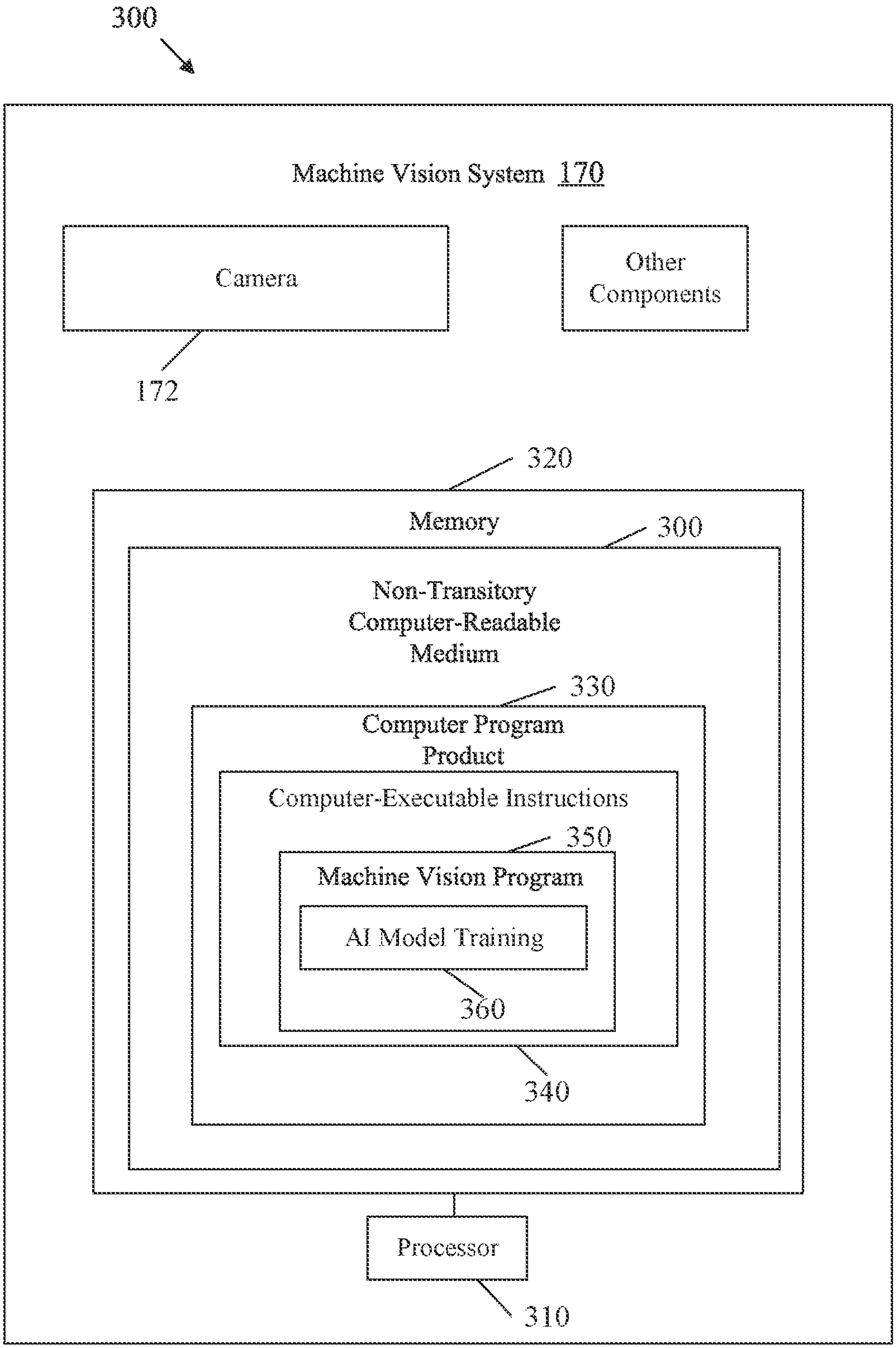
FIG. 3 is a schematic block diagram of a machine vision system for a singulation system.

FIG. 3 is a schematic block diagram of machine vision system 170 for use by a singulation system, such as example automated foodstuff singulation system 100. In addition to comprising camera 172, machine vision system 170 may comprise non-transitory computer-readable medium 300 in memory 320. Non-transitory computer-readable medium 300 may comprise computer program product 330. Computer program product 330 may further comprise stored computer-executable instructions 340, including a machine vision program 350, which is comprised of an artificial intelligence (AI) training model 360. When executed by processor 310, computer program product 330 may cause singulation system 100 to train the AI training model 360 of machine vision system 170 to singulate foodstuff by performing method 500 (discussed infra). AI training model 360 may be configured to detect, localize, and categorize foodstuff arrangements from images of foodstuff captured and transmitted from camera 170. Non-transitory computer-readable medium 300, when utilizing stored computer-executable instructions 340, may also be configured to inspect and grade foodstuff separation and orientation.

As noted above, image acquisition and inspection may be performed by employing camera 172 and machine vision system 170. Non-transitory computer-readable medium 300 comprising its component parts may include computer-executable instructions 340 that, when executed, may train an AI model of the machine vision system using AI model training 360. For example, initially, a quantity of foodstuff units may be positioned in camera 172's center field of view. Images of randomly dispersed orientations of foodstuff may be taken if a satisfactory variety of orientations are seen. Camera 172 may be aligned vertically downwards, and the environment for capturing images may be adjusted to reduce possible light reflections from surroundings. Camera 172's exposure and focus may be calibrated, ensuring distinct visibility and pronounced contrast of foodstuff units 182 against a background. Calibration may take into account ambient lighting conditions and the distance between camera 172 and foodstuff units 182. In each imaging session, data from the images of foodstuff units 182 may be recorded. Images may be captured of foodstuff units 182 out-of-liquid and under-liquid. After a desired amount of images is gathered, the distribution and orientation of foodstuff units 182 in each image may be randomized to simulate a singulation process. Such image acquisition may eventually lead to a dataset with a number of images that may be categorized. Training machine vision system 170 using AI model training 360 may be done by using the training dataset comprising the plurality of images of input foodstuff and corresponding plurality of output foodstuff. Further, AI model training 360 may include generating some candidate models with different architectures and parameters. Each of the candidate models may involve training the AI model on a validation dataset by selecting a preferred-performing model from the plurality of models based on evaluation of the AI model on a validation dataset.

Figure 4:
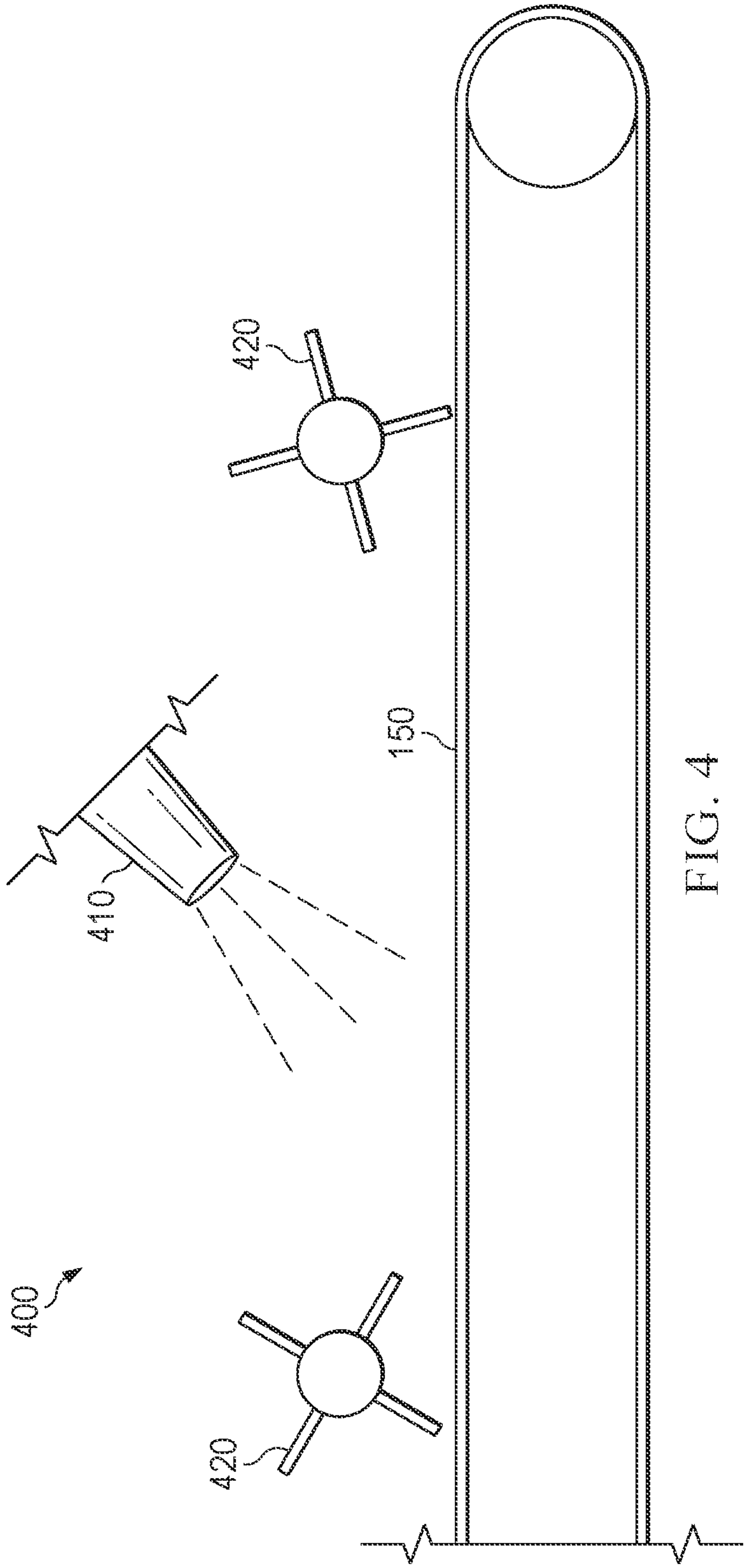
FIG. 4 is a schematic diagram of a dewatering, flipping, and turning system.

FIG. 4 is a schematic diagram of a dewatering, flipping, and turning system 400 that may be a part of example automated foodstuff singulation system 100. Dewatering, flipping, and turning system 400 may comprise an air blower 410 and rotating paddles 420. Air blower 410 and rotating paddles 420 may be positioned adjacent to output mechanism 150. Air blower 410 may be configured to dewater foodstuff. Dewatering foodstuff via air blowers 410 may aid in minimizing the effects of liquid absorbing on foodstuff during the sinking and lifting processes. Dewatering refers to the process of removing any liquid from something. Dewatering may be seen as a broad term used in various contexts but generally involves techniques to separate liquids from solids or semi-solids. Rotating paddles 420 may be configured to flip and turn incorrectly oriented foodstuff units.

Figure 5:
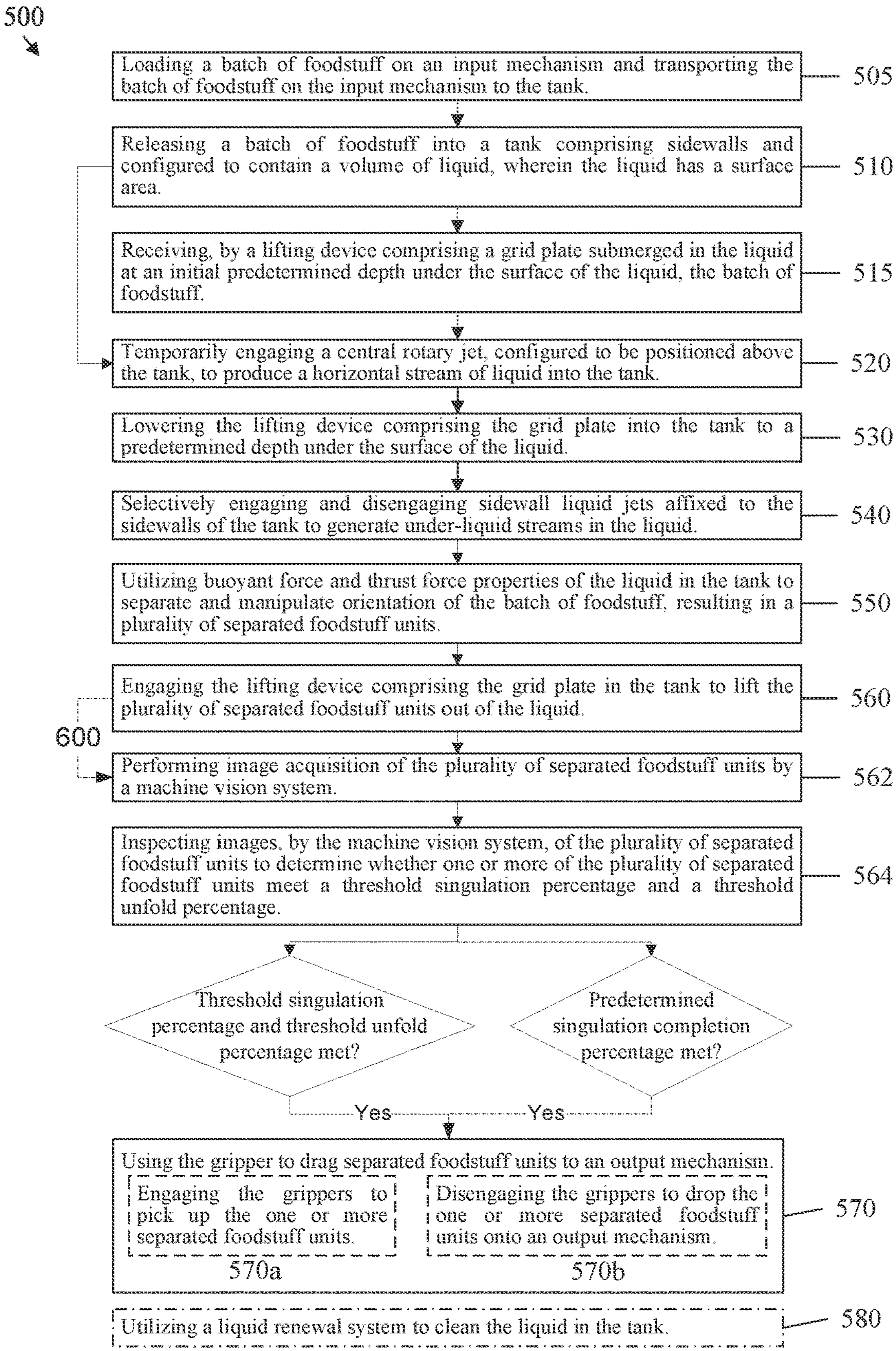
FIG. 5 is a flowchart of an example method for singulating foodstuff.

FIG. 5 is a flowchart of an example method 500 for singulating foodstuff. Method 500 may utilize buoyant force and thrust force properties of liquid 110 in tank 102 to separate and manipulate orientation of batch of foodstuff 180, resulting in a plurality of separated foodstuff 182.

At step 505, before releasing batch of foodstuff 180 into tank 102, method 500 may comprise loading a batch of foodstuff 180 on an input mechanism 140 and transporting the batch of foodstuff 180 on input mechanism 140 to tank 102.

At step 510, method 500 may comprise releasing a batch of foodstuff 180 into tank 102 comprising sidewalls 104 and configured to contain volume of liquid 110. Liquid 110 may have a surface in tank 102. Liquid 110 comprised in volume of liquid 110 may be water or any other suitable liquid appropriate for foodstuff processing. Batch of foodstuff 180 may be released into tank 102 from varying drop-down heights. Batch of foodstuff 180 may comprise different weights and quantities of foodstuff to be separated. At step 515, method 500 may comprise receiving, by lifting device 130 comprising grid plate 132 submerged in liquid 110 at an initial predetermined depth (e.g., 2-3 cm) under the surface of the liquid 110, a batch of foodstuff 180. Grid plate 132 may be initially placed at or near the bottom of tank 102 and lifted out of the liquid with varying lifting speeds. Batch of foodstuff 180 may be moved and separated under liquid 110 using the buoyancy properties of liquid 110.

At step 520, method 500 may comprise temporarily engaging central rotary liquid jet 122 to produce a horizontal stream of liquid into tank 102. Central rotary liquid jet 122 may be configured to be positioned above tank 102 and may be lowered close to grid plate 132 and batch of foodstuff 180. The horizontal stream of liquid produced by central rotary liquid jet 122 may be capable of covering a rotational area from 0° to 360°. Central rotary liquid jet 122 may perform several rotational motions while producing the horizontal stream of liquid used to separate and spread batch of foodstuff 180.

At step 530, method 500 may comprise lowering lifting device 130 comprising grid plate 132 into tank 102 to a predetermined depth under the surface of liquid 110. Lifting device 130 comprising grid plate 132 may aid in the realization of singulation (unfolding and separation) by varying sinking and lifting motion and speed. The second predetermined depth under the surface of liquid 110 may place grid plate 132 at a depth relative to the surface of liquid 110 in tank 102 or relative to affixed sidewall liquid jets 124.

At step 540, method 500 may comprise selectively engaging and disengaging sidewall liquid jets 124 affixed to sidewalls 104 of tank 102 to generate under-liquid streams in liquid 110. Selective engagement of sidewall liquid jets 124 may correspond to certain areas where further singulation (unfolding and separation) of batch of foodstuff 180 is desired. The under-liquid streams generated by sidewall liquid jets 124 may vary in pressure and direction. At step 550, method 500 may further comprise utilizing buoyant force and thrust force properties of liquid 110 in tank 102 to separate and manipulate the orientation of batch of foodstuff 180 resulting in a plurality of separated foodstuff units 182. Buoyant force and thrust force properties of liquid 110 in tank 102 to separate and manipulate the orientation of batch of foodstuff 180 resulting in a plurality of separated foodstuff units 182 may also take place in conjunction with other steps of method 500.

At step 560, method 500 may further comprise engaging lifting device 130 comprising grid plate 132 in tank 102 to lift plurality of separated foodstuff units 182 out of liquid 110. At step 562, method 500 may further comprise performing image acquisition of the plurality of separated foodstuff units 182 by machine vision system 170. At step 564, method 500 may further comprise inspecting images, by machine vision system 170, of the plurality of separated foodstuff units 182 to determine whether one or more of the plurality of separated foodstuff units meet a threshold singulation percentage and a threshold unfold percentage. Threshold unfold percentage and threshold singulation percentage are measurements referring to percentage measurements of individual separated foodstuff units 182. Threshold singulation and unfold percentages may be examined and compared to determine the effects of control parameters. Multiple linear regression models may be used to predict singulation and unfolding performance and to estimate batch size and processing speed requirements. When separated foodstuff units meet the threshold singulation percentage and the threshold unfold percentage, at step 570, method 500 may comprise using gripper 162 to drag separated foodstuff units 182 to an output mechanism 150. In some cases, step 570 may comprise sub-steps 570*a* and/or 570*b* (discussed infra). In addition, in some instances, the predetermined singulation percentage for singulating the batch of foodstuff 180 may need to be achieved. In such cases, if this also occurs, then step 570 may take place.

If a predetermined singulation completion percentage for singulating batch of foodstuff 180 has not been achieved, steps 505-564 (for singulating batch of foodstuff 180 to result in a plurality of separated foodstuff units 182) may be repeated. Recall that completion percentage may be a percentage measurement of the amount of singulation of an entire batch of foodstuff 180, whereas unfold percentage and singulation percentage may refer to percentage measurements of individually separated foodstuff units 182.

As indicated earlier, step 570 of method 500 may comprise sub-steps. For instance, at step 570*a*, method 570 may comprise engaging gripper 162 to pick up one or more separated foodstuff units 182 and disengaging gripper 162 to drop the one or more separated foodstuff units 182 onto an output mechanism 150. Parts of these sub-steps may be performed, for example, to transport one or more separated foodstuff units 182 to a dewatering, flipping, and turning system and eventually to an output mechanism.

At step 580, method 500 may comprise renewing liquid 110, utilizing liquid renewal system 190, to enhance the cleanliness of liquid 110 and foodstuff in tank 102. This step may occur once or multiple times between various steps throughout the method 500.

Figure 6:
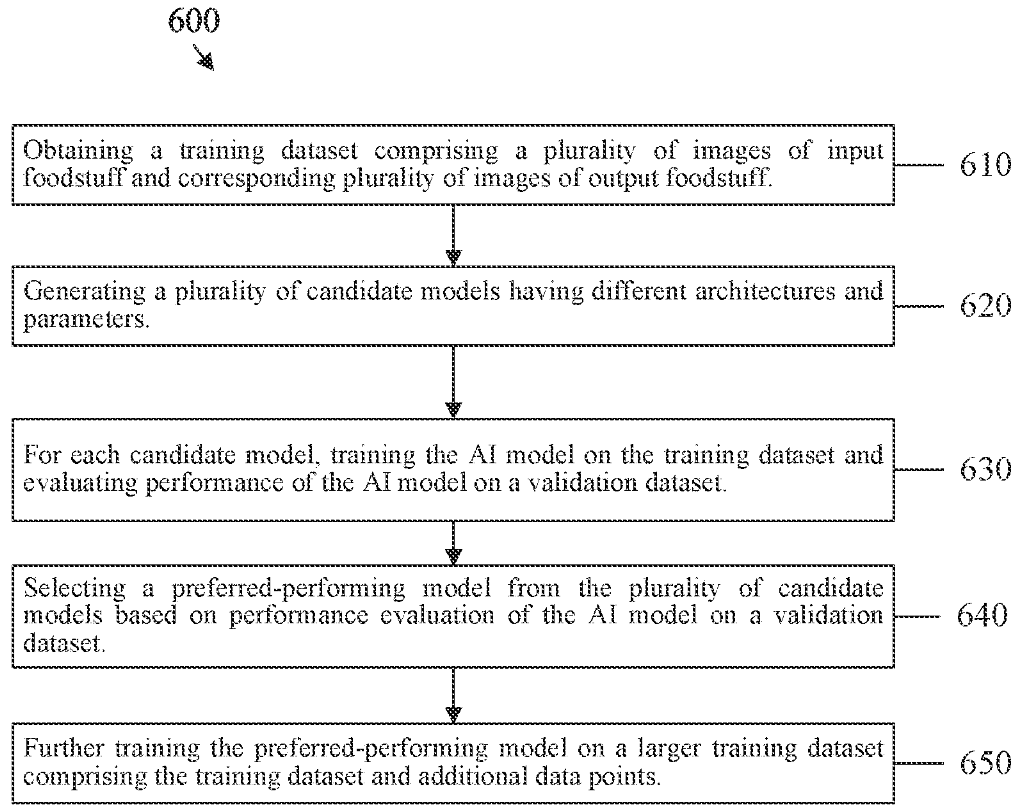
FIG. 6 is a flowchart of an example method for training a machine vision system using an artificial intelligence (AI) model.

Turning now to FIG. 6, a flowchart of an example method 600 for training machine vision system 170 using an artificial intelligence (AI) model is depicted. Method 600 may be performed before or during the execution of method 500. Example method 600 may be implemented in non-transitory computer-readable medium 300. At step 610, method 600 may comprise obtaining a training dataset comprising a plurality of images of input foodstuff and corresponding plurality of images of output foodstuff. The plurality of input foodstuff may further comprise a plurality of images of under-liquid foodstuff to be used to assess singulation performance and selectively control operations of central rotary liquid jet 122 and one or more sidewall liquid jets 124. The plurality of input foodstuff may also comprise a plurality of images of out-of-liquid foodstuff, wherein the plurality of images of out-of-liquid foodstuff are used to identify correctly separated and oriented foodstuff. The plurality of images may be randomized to simulate a singulation process. The plurality of images of input foodstuff and plurality of images of output foodstuff may be categorized into categories—such example categories are illustrated in FIG. 7 (discussed infra).

At step 620, method 600 may comprise generating a plurality of candidate models having different architectures and parameters. For each candidate model, at step 630, method 600 may comprise training the AI model on the training dataset and evaluating performance of the AI model on a validation dataset. At step 640, method 600 may comprise selecting a preferred-performing model from the plurality of candidate models based on performance evaluation of the AI model on a validation dataset. At step 650, method 600 may comprise further training the preferred-performing model on a larger training dataset comprising the training dataset and additional data points.

To accommodate designated singulation control parameters, AI model of machine vision system 170 may adjust various parameters, including: drop-down height and lifting speed of a lifting device 130 with a grid plate 132, batch size of a batch of foodstuff 180, batch weight of the batch of foodstuff 180, and numbers, locations, power outputs, and frequency of liquid jets 120. AI model of machine vision system 170 may examine and compare multiple linear regression models to: determine effects of control parameters, determine effects for various production scales, predict singulation and unfolding performance, and estimate batch sizes and related processing speeds.

Figure 7:
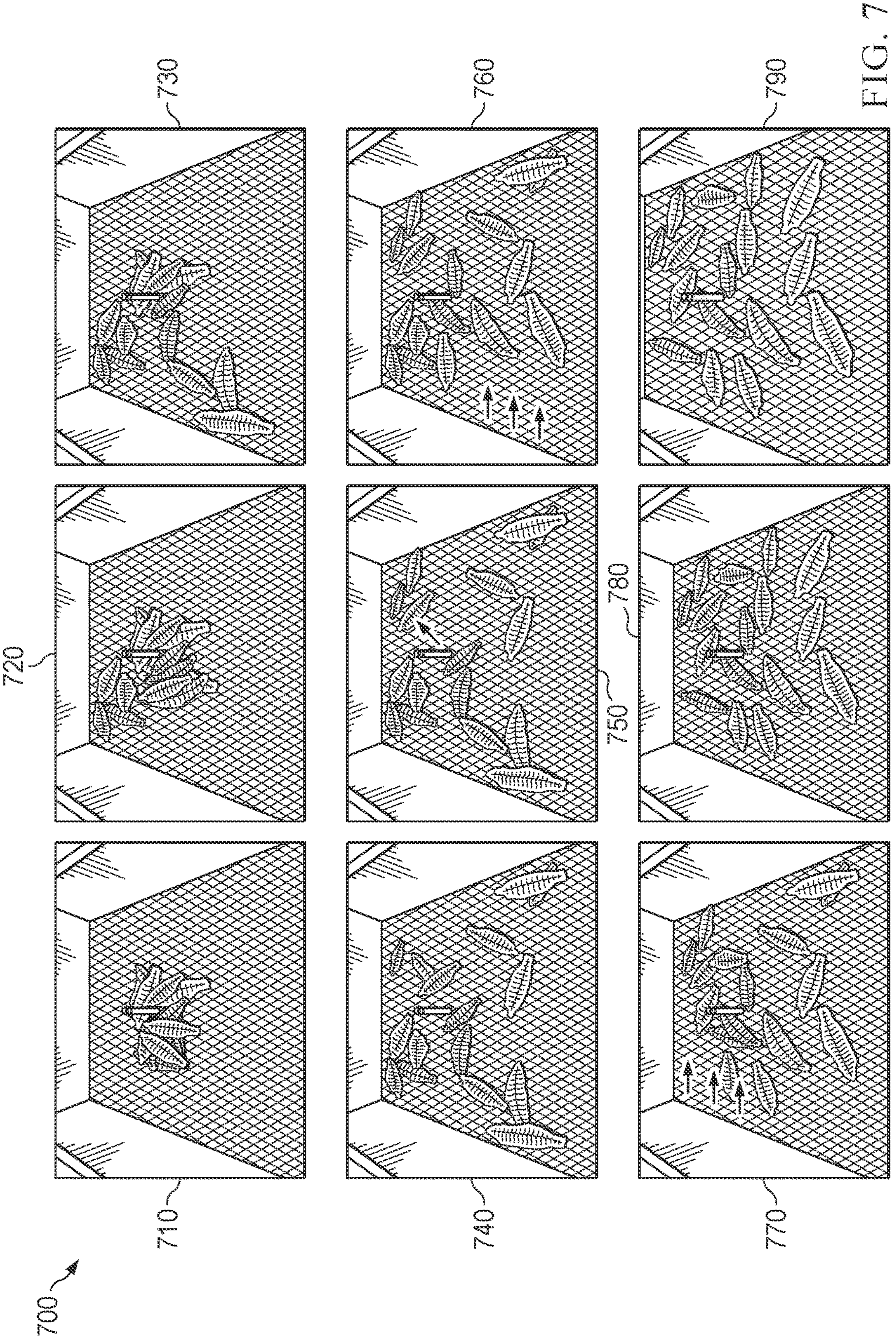
FIG. 7 is a graphical illustration of an example singulation process.

FIG. 7 illustrates an example singulation process 700. Images in this example singulation process 700 may be collected by camera 172 of machine vision system 170. Block 710 depicts a batch of foodstuff 180 in tank 102 after release from an input mechanism 140 and receipt by lifting device 130 comprising grid plate 132. Blocks 720, 730, and 740 depict the effects of temporarily engaging a central rotary liquid jet 122 to produce 360° of horizontal stream of liquid into tank 102 a plurality of times, namely breaking apart and spreading parts of batch of foodstuff 180. Block 750 depicts a resulting plurality of foodstuff from the batch of foodstuff 180. After further lowering lifting device 130 into tank 102 to a second predetermined depth under the surface of liquid 110, blocks 760 and 770 depict the effects of selectively engaging and disengaging sidewall liquid jets 124 affixed to sidewalls 104 of tank 102 to generate under-liquid streams in liquid 110-namely, further breaking apart and dispersing batch of foodstuff 180. Block 780 depicts successful singulation of batch of foodstuff 180 to foodstuff units 182 as determined after engaging lifting device 130 comprising grid plate 132 in tank 102 to lift plurality of separated foodstuff units 182 out of liquid 110 may and performing image acquisition of the plurality of separated foodstuff units 182 by machine vision system 170. Block 790 depicts foodstuff units 182 in a state ready for collection using gripper 162 to drag separated foodstuff units 182 to an output mechanism 150.

Figure 8:
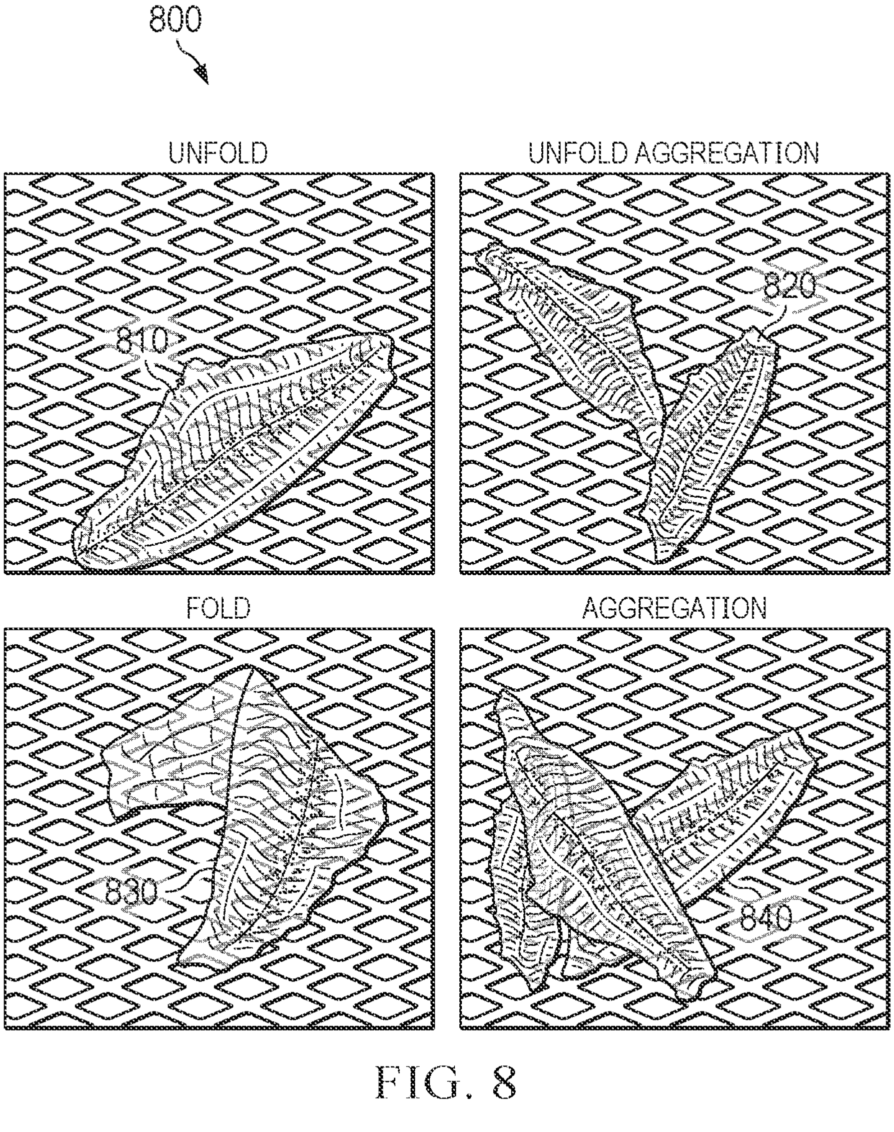
FIG. 8 is a graphical illustration of example categories for classifying images of foodstuff.

FIG. 8 illustrates examples of categories 800 into which the plurality of images of input foodstuff and plurality of images of output foodstuff may be grouped into categories. The categories may comprise Unfold category 810, Unfold-Aggregation category 820, Fold category 830, and Aggregation category 840. Unfold category 810 may comprise images of foodstuff units 182 that are correctly separated from other foodstuff units 182 or batches of foodstuff 180 and correctly oriented for later processing. UnfoldAggregation category 820 may comprise images of foodstuff units 182 that are adjacent to and not separated from other foodstuff units 182 or batches of foodstuff 180, but are otherwise correctly oriented. Fold category 830 may comprise images of individual foodstuff units 182 that are folded upon themselves but are otherwise correctly separated from other foodstuff units 182 or batches of foodstuff 180. Aggregation category 840 may comprise images of individual foodstuff that are stacked upon and not correctly separated from other foodstuff units 182 or batches of foodstuff 180. When foodstuff is categorized as either Unfold category 810 or UnfoldAggregation category 820, such foodstuff may not require further manipulation operation for later processing. When foodstuff is categorized as either Fold category 830 or Aggregation category 840, such foodstuff may require further manipulation operations by singulation system to be correctly separated and correctly oriented.

Figure 9:
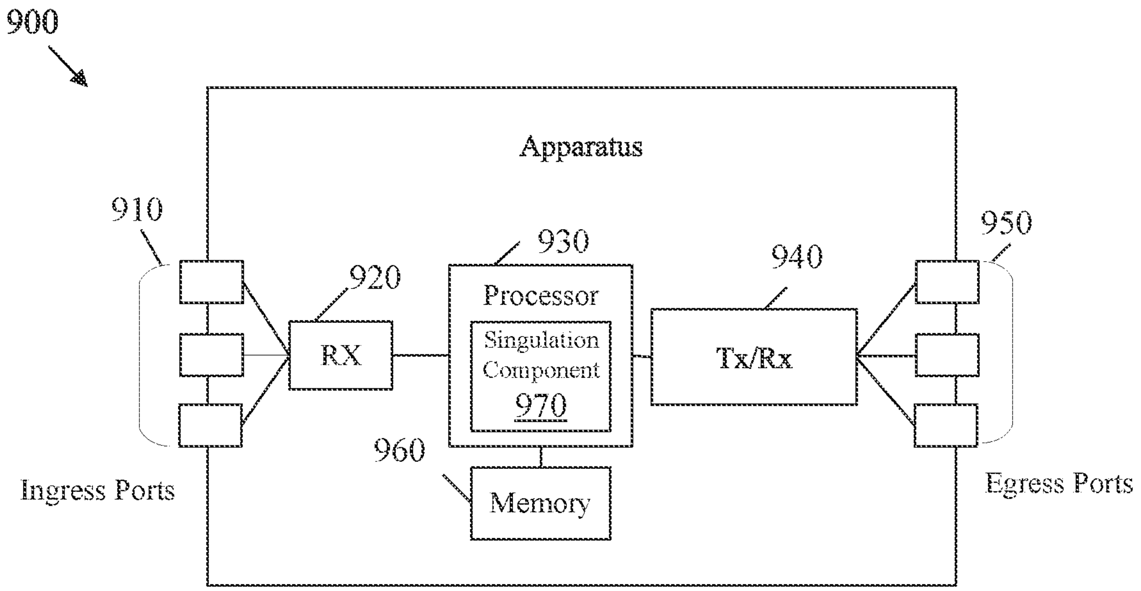
FIG. 9 is a schematic diagram of an example apparatus for implementing singulation processes.

FIG. 9 is a schematic diagram of apparatus 900 according to an embodiment of the disclosure. Apparatus 900 may implement the disclosed embodiments. The apparatus 900 comprises ingress ports 910 and a receiver unit (RX) 920 to receive data; a processor 930, or logic unit, baseband unit, or central processing unit (CPU), to process the data; a transmitter unit (TX) 940 and egress ports 950 to transmit the data; and a memory 960 to store the data. The apparatus 900 may also comprise optical-to-electrical (OE) components, electrical-to-optical (EO) components, or radio frequency (RF) components coupled to the ingress ports 910, the RX 920, the TX 940, and the egress ports 950 to provide ingress or egress of optical signals, electrical signals, or RF signals.

The processor 930 is any combination of hardware, middleware, firmware, or software. The processor 930 comprises any combination of one or more CPU chips, cores, field-programmable gate arrays (FPGAs), application-specific integrated circuits (ASICs), or digital signal processors (DSPs). The processor 930 communicates with the ingress ports 910, the RX 920, the TX 940, the egress ports 950, and the memory 960. The processor 930 comprises a singulation component 970, which implements the disclosed embodiments. The inclusion of the singulation component 970, therefore provides a substantial improvement to the functionality of the apparatus 900 and effects a transformation of the apparatus 900 to a different state. Alternatively, the memory 960 stores the singulation component 970 as instructions, and the processor 930 executes those instructions.

Memory 960 comprises any combination of disks, tape drives, or solid-state drives. The apparatus 900 may use the memory 960 as an overflow data storage device to store programs when the apparatus 900 selects those programs for execution and to store instructions and data that the apparatus 900 reads during execution of those programs. The memory 960 may be volatile or non-volatile and may be any combination of read-only memory (ROM), random-access memory (RAM), ternary content-addressable memory (TCAM), or static RAM (SRAM).

A computer program product (e.g., computer program product 330) may comprise computer-executable instructions (e.g., computer-executable instructions 340) that are stored on a computer-readable medium (e.g., non-transitory computer-readable medium 300) and that, when executed by a processor (e.g., processor 310), cause an apparatus (e.g., machine vision system 170) to perform any of the embodiments. The non-transitory medium may be the memory 960 (or memory 320), the processor may be the processor 930 (or processor 310), and the apparatus may be the apparatus 900.

Figure 10:
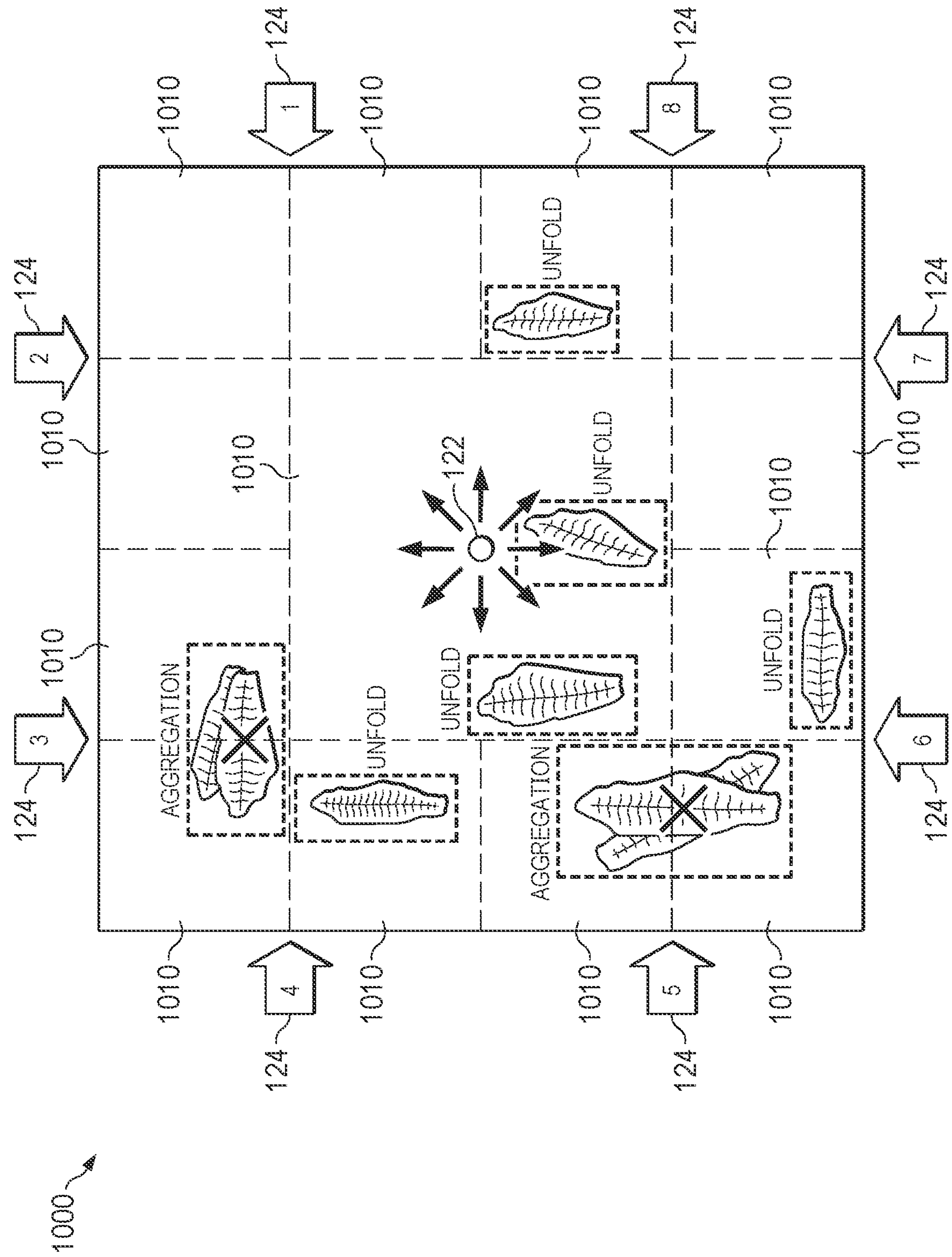
FIG. 10 is a graphical illustration of an example singulation system operation.

FIG. 10 illustrates a schematic of an example singulation system operation 1000 for a particular type of foodstuff (catfish fillets). Working space in tank 102 comprising liquid 110 may be split into a quantity (e.g., 13) working areas 1010. Pipes supplying liquid to sidewall liquid jets 124 may produce streams in the directions depicted. Central rotary liquid jet 122 may also be utilized. Each sidewall liquid jet 124 may cover more than one area (as depicted), while central rotary liquid jet 122 may cover the central quadrant or the entire working area. Foodstuff categorized as Unfold category 810 may be deemed ready for collection. While foodstuff categorized as UnfoldAggregation category 820 (not depicted), Fold category 830 (not depicted), or Aggregation category 840 (as depicted and marked with an "X") may be deemed not ready for collection and require further manipulation.

Figure 11:
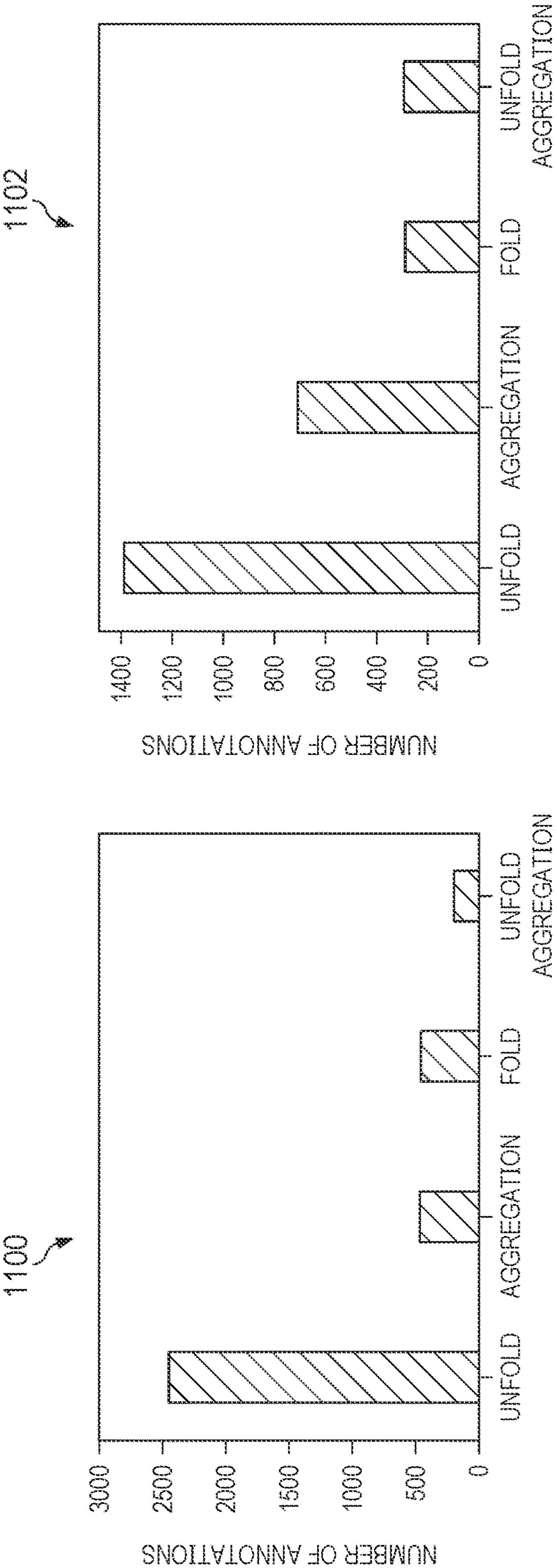
FIG. 11 is a set of graphs of an example distribution of foodstuff imagery comprising categories.

FIG. 11 is a set of bar plots of an example distribution of foodstuff imagery comprising four categories—Unfold category 810, UnfoldAggregation category 820, Fold category 830, and Aggregation category 840. Bar plot 1100 depicts example categorization of under-liquid image data gathered. Bar plot 1102 depicts example categorization of out-of-liquid image data gathered. As discussed earlier, in the AI training model 360, a plurality of images of input foodstuff may further comprise a plurality of images of under-liquid foodstuff and a plurality of images of out-of-liquid foodstuff. The plurality of images of under-liquid foodstuff may be used to assess singulation performance and selectively control operations of a central rotary liquid jet 122 and one or more sidewall liquid jets 124. The plurality of images of out-of-liquid foodstuff may be used to identify correctly separated and oriented foodstuff. The plurality of images may be randomized to simulate a singulation process. Referring back to how image acquisition may be performed (supra) in an embodiment, such image acquisition may eventually lead to a dataset with a number of images (e.g., 400 images as discussed above) that may be grouped into the four categories.

Figure 12:
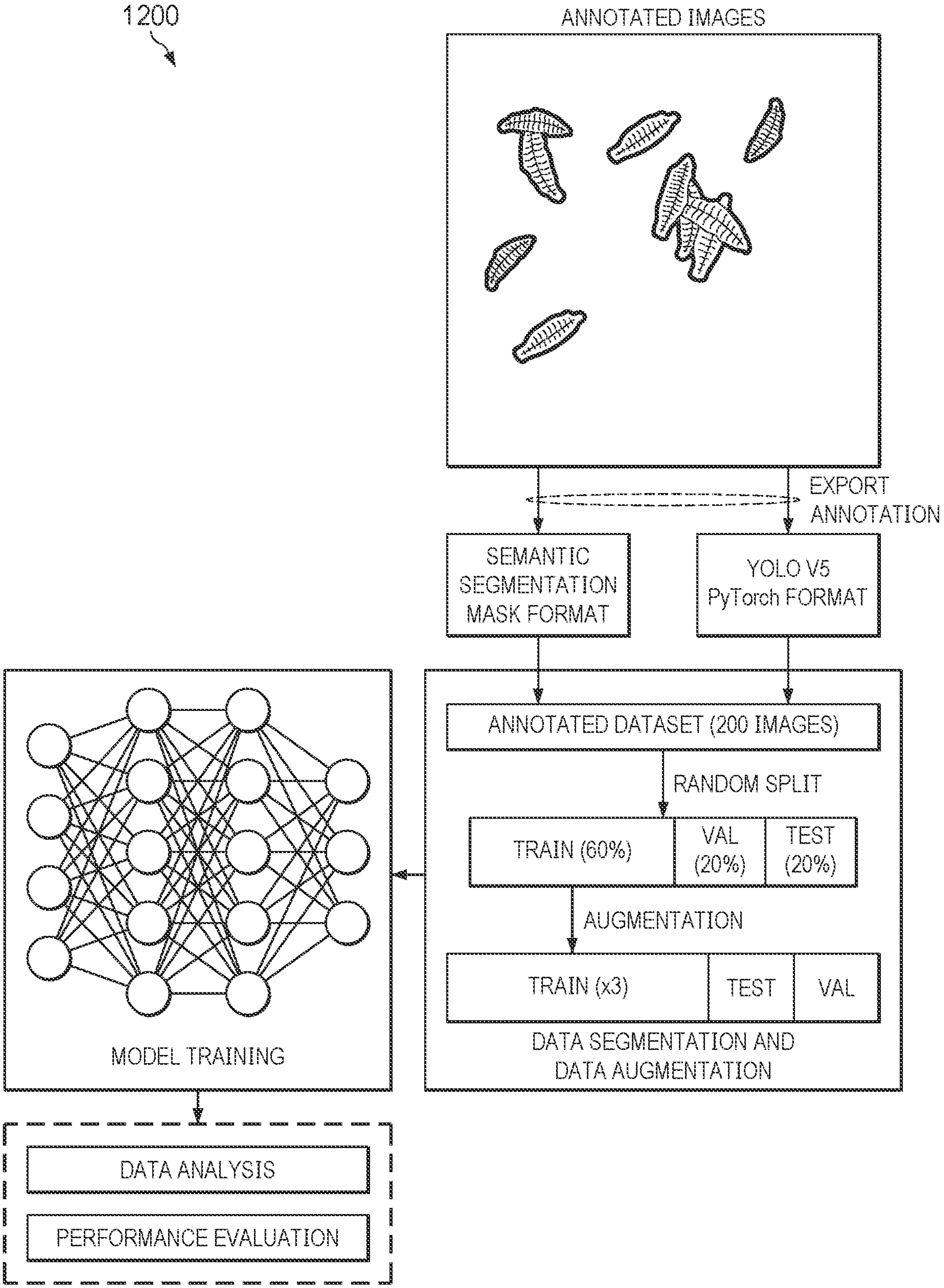
FIG. 12 is a graphical illustration of an example of a foodstuff unit detection/segmentation pipeline.

FIG. 12 is an illustration of an example of a pipeline of foodstuff unit detection/segmentation 1200 executed on Google Colaboratory (Colab). AI training model 360 may initiate with the acquisition of original images. During an image annotation phase, these images may be annotated with polygonal boundaries to capture the unique shapes and orientations of foodstuff units. These annotations may provide a robust representation of each foodstuff unit 182, enhancing the accuracy of model training. Once annotated, the images may be exported to distinct formats (e.g., YOLOv5 PyTorch format (a format that combines the object detection capabilities of YOLOv5 with the development and training environment offered by PyTorch, an open-source deep learning framework used for developing and training neural networks), JavaScript Object Notation (JSON) format, Semantic Segmentation Mask format, and Portable Network Graphics (PNG)). The justification for using different formats may lie in their respective applications. For example, the YOLOv8 instance segmentation utilizes the JSON format to identify individual foodstuff units, discerning their unique shapes and positions. On the other hand, the SegFormer-B5 semantic segmentation employs the PNG format to understand the broader categories of foodstuff unit orientations, offering a more generalized view of the foodstuff unit types. Together, the different segmentation methods may provide a holistic approach to foodstuff detection and categorization.

To assess the performance of SegFormer-B5, the Intersection over Union (IoU) measure may be used. This IoU measurement may be computed as the ratio between the intersection and the union of the "predicted mask" and the "ground-truth mask"

$$\left(IoU = \frac{|A \cap B|}{|A \cup B|}\right).$$

Moreover, mean Intersection over Union (mIoU) may offer an average of the IoU scores across all classes in each dataset $$\left(mIoU = \frac{1}{k+1}\sum_{i=0}^{k} IoU_i\right).$$

A and B may represent the "predicted mask" and "ground-truth mask" corresponding to all category instances in the current image, respectively. And mIoU may be obtained by summing the IoU values for each class from 0 to k (e.g., for four categories, k is 3) and dividing by the total number of classes (k+1). To evaluate YOLOv8's performance, the average precision (AP) may be calculated using precision (P) and recall (R) at an Intersection over Union (IoU) threshold of 50%. Precision, defined as the ratio of true positives (TP) to the sum of TP and false positives (FP), may indicate the model's accuracy in identifying true positive masks. The ratio of TP to the sum of TP and false negatives (FN) may gauge the model's capability to detect positive instances within the dataset using masks. Both metrics may be determined by comparing predicted masks to ground truth annotations.

Furthermore, to provide a comprehensive assessment, the mean Average Precision (mAP) may be used. mAP is a summary metric that averages the AP across various IoU thresholds. Specifically, two scenarios may be considered: a single IoU threshold of 50% and an average over multiple thresholds ranging from 50% to 95%. While an IoU of 50% may indicate a relatively loose overlap between the predicted masks and ground truth, higher thresholds may demand a tighter match. By considering these varied thresholds, mAP may offer a more robust evaluation, emphasizing the model's overall proficiency in mask predictions across diverse conditions. The mAP for all categories of foodstuff unit orientation may be calculated using the equation:

$$mAP = \frac{1}{N}\sum_{i=1}^{N} AP_i,$$

where APi represents the AP value for an individual category (i=1, 2, 3, 4). As a primary metric in multi-class instance segmentation, mAP may be evaluated for various IoU thresholds (e.g., ranging from 0.50 to 0.95 with a 0.05 step size—mAP may also be calculated when the IoU threshold is set to 0.5). Thus, more than one IoU threshold (e.g., mAP@0.5 and mAP@[0.5:0.95]) may be reported for YOLOv8 performance evaluation.

Figure 13:
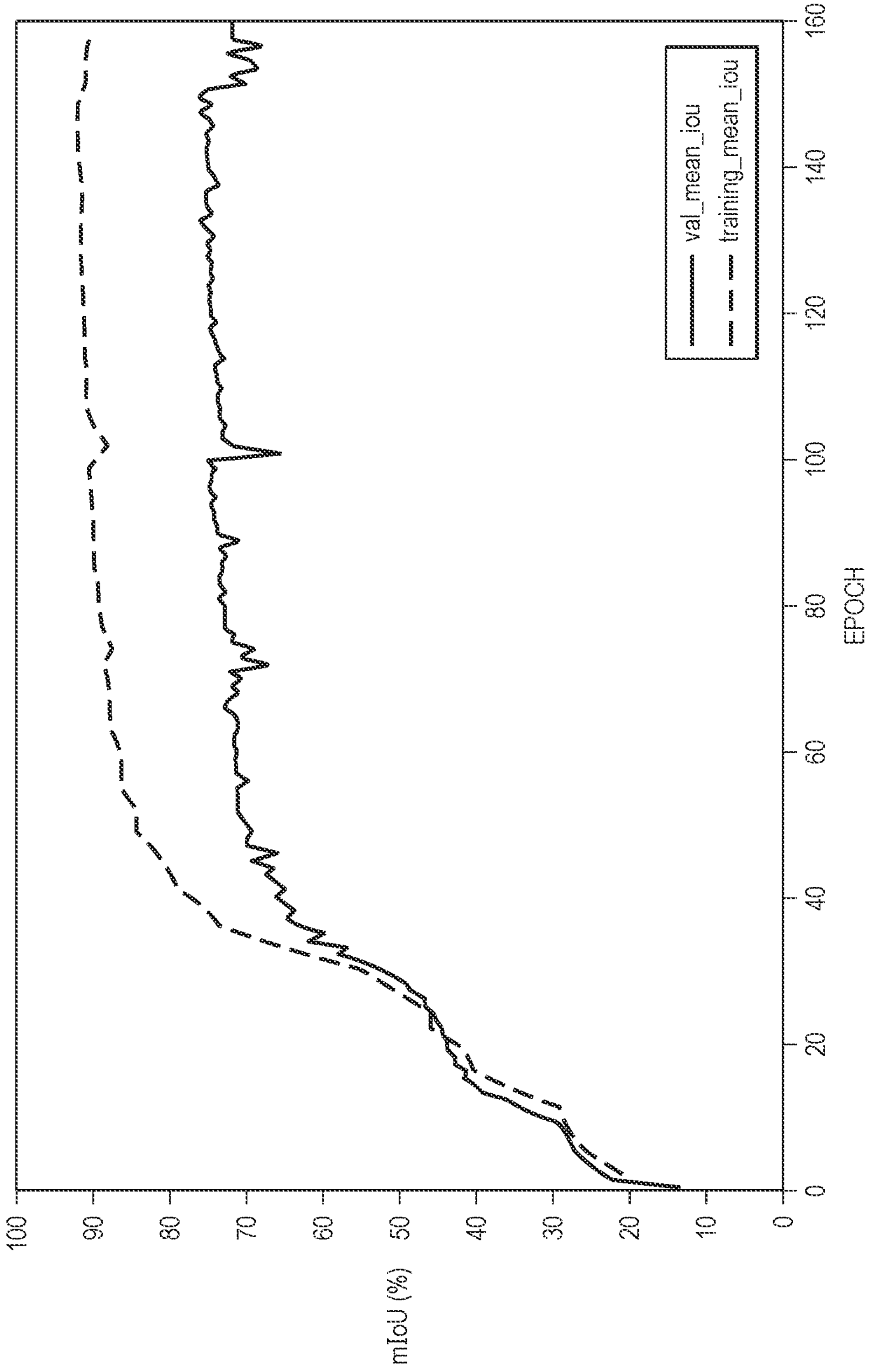
FIG. 13 is a graph of example training and evaluation mean intersection over union curves of a deep learning model for out-of-liquid foodstuff units.

FIG. 13 is a graphical representation 1300 of an example training and evaluation mIoU curves of SegFormer-B5 for out-of-liquid foodstuff units (e.g., catfish fillets). As shown, the example model achieves a mIoU of 92.1% (represented by the training_mean_iou curve) in 160 epochs, converging by the 59th epoch, demonstrating that 160 epochs were sufficient for the current dataset. However, results from the validation (a result of 76.4%, represented by the val_mean_iou curve) and test set (a result of 66.5%, not graphically represented but directly outputted by the example model) lagged the training set's 92.1%. This difference could be due to model overfitting or insufficient training data. Despite such discrepancies, the method may remain useful. By extracting predicted masks, the centroid of each object may be computed, determining its position and category. This ability may provide a foundation for further processing to improve accuracy and may have potential for downstream applications. With additional data and refinement, this approach may yield more precise outcomes.

Figure 14:
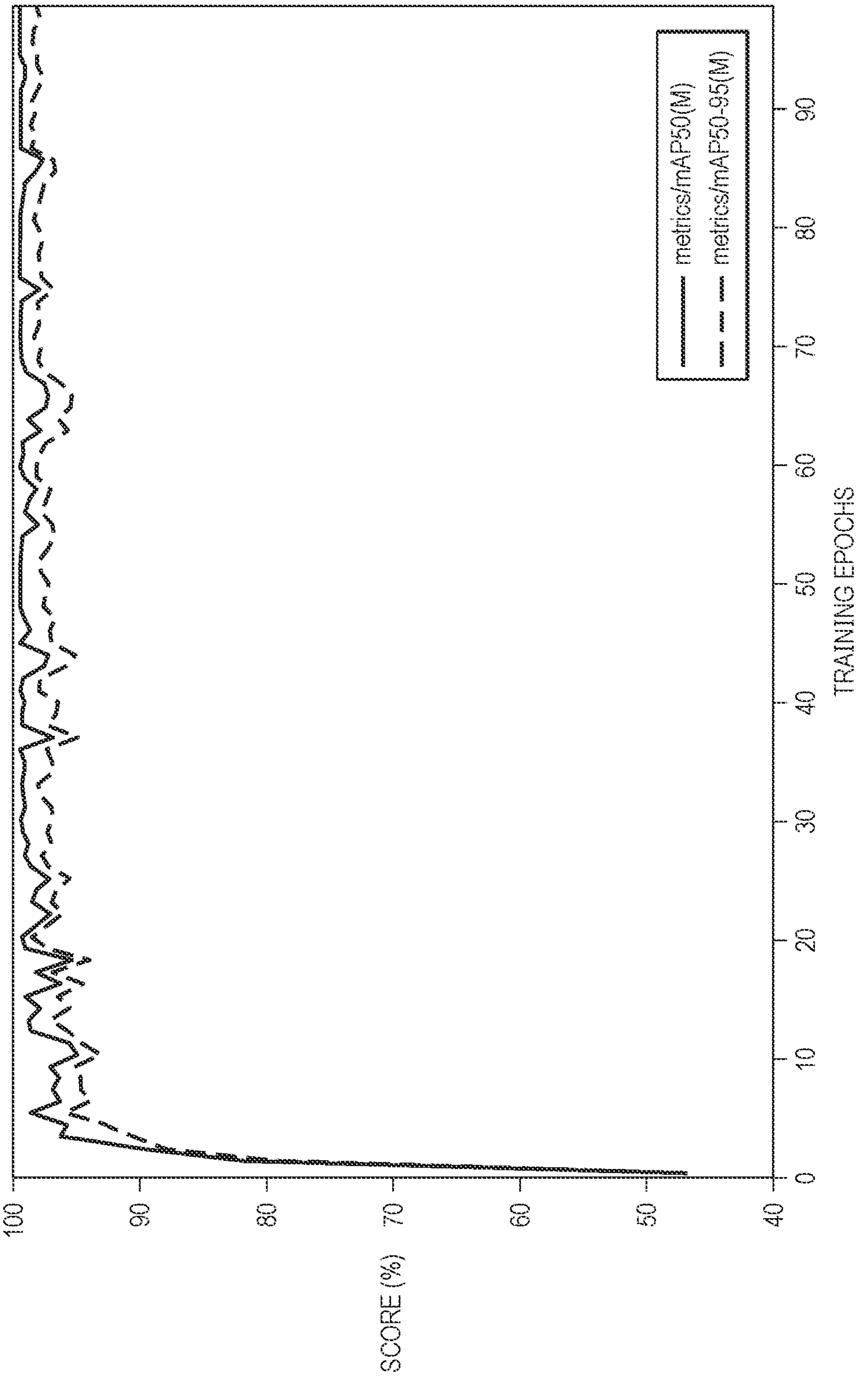
FIG. 14 is a graph of example training curves of a deep learning model for out-of-liquid foodstuff.

FIG. 14 is a graphical representation 1400 of example training curves using the YOLOv8 deep learning model for out-of-liquid foodstuff. As can be seen, the mAP is shown to reach 99.5% for mAP@0.5 and 98.7% for mAP@[0.5:0.95] in 100 epochs of model training.

Figure 15:
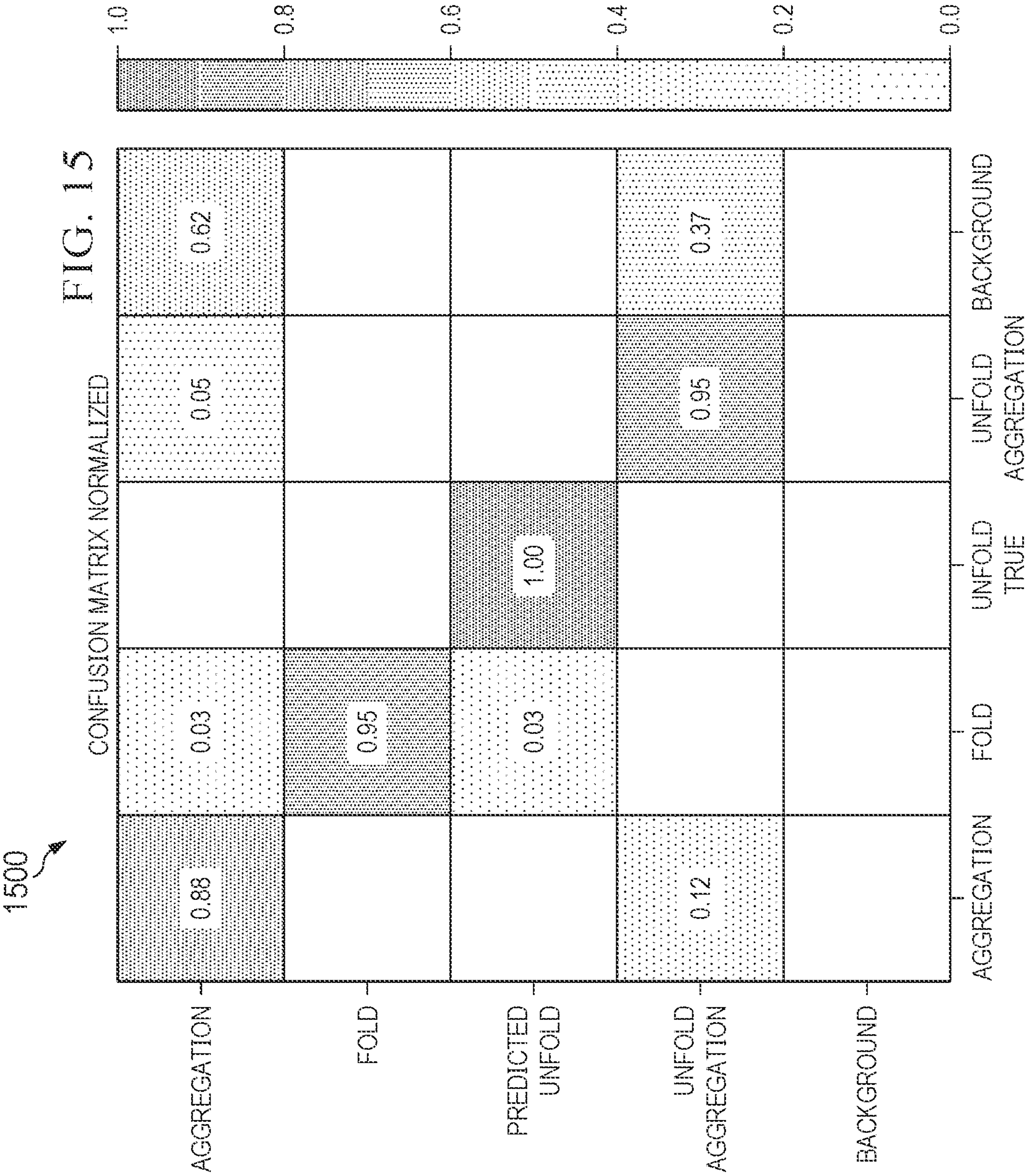
FIG. 15 is a graph of an example deep learning model confusion matrix for out-of-liquid foodstuff.

FIG. 15 is a graphical representation 1500 of an example YOLOv8 deep learning confusion matrix, which may demonstrate the ability of a model to recognize foodstuff units out-of-liquid in a test set. As can be seen in this example matrix, recognition accuracy reaches high levels for all categories.

Figure 16:
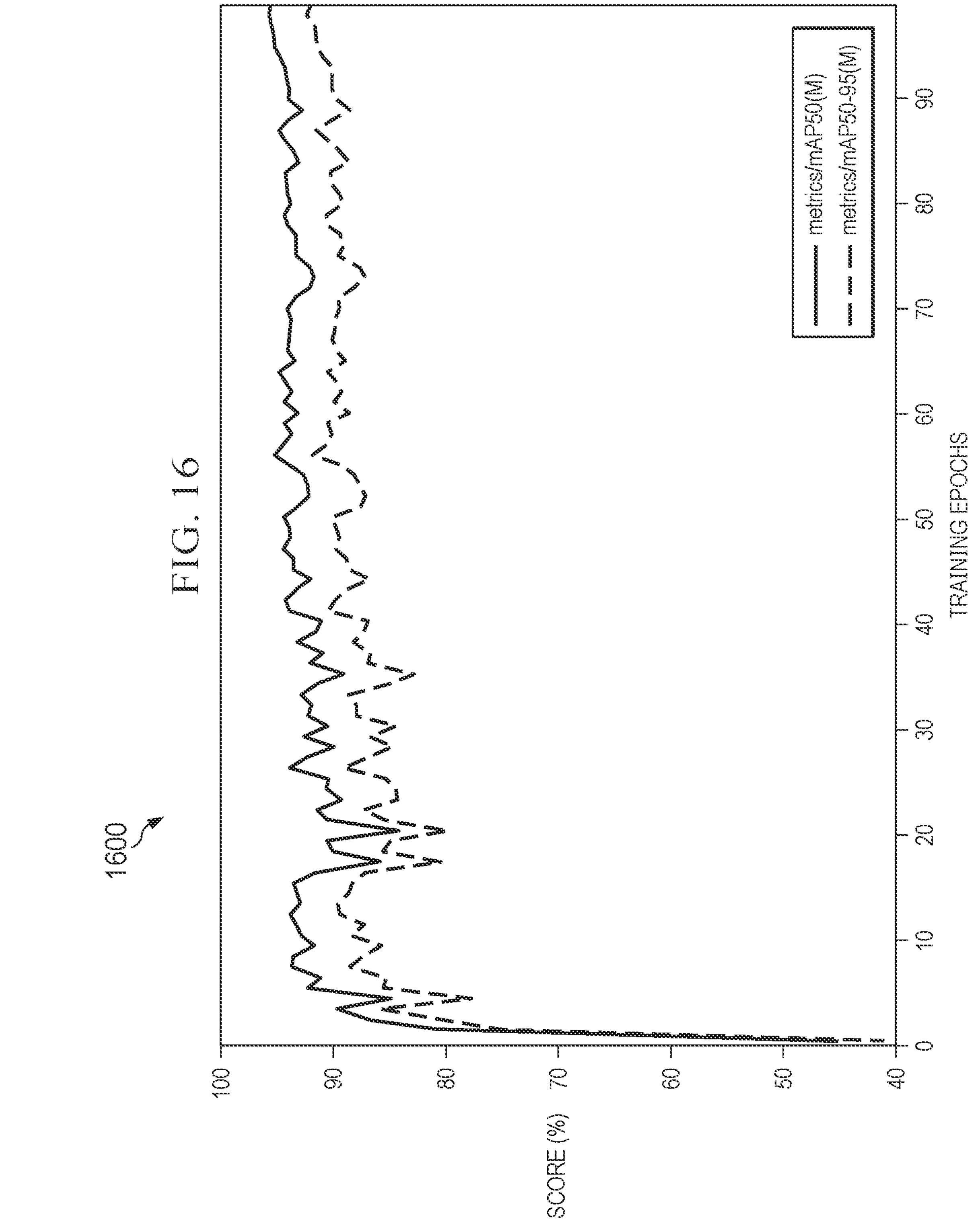
FIG. 16 is a graph of example training curves of a deep learning model for under-liquid foodstuff.

FIG. 16 is a graphical representation 1600 of example training curves using the YOLOv8 deep learning model for under-liquid foodstuff. Similar to the out-of-liquid conditions, desired training results may be achieved with mAP achieving 95.7% for mAP@0.5 and 92.4% for mAP@[0.5:0.95] in 100 epochs of model training.

Figure 17:
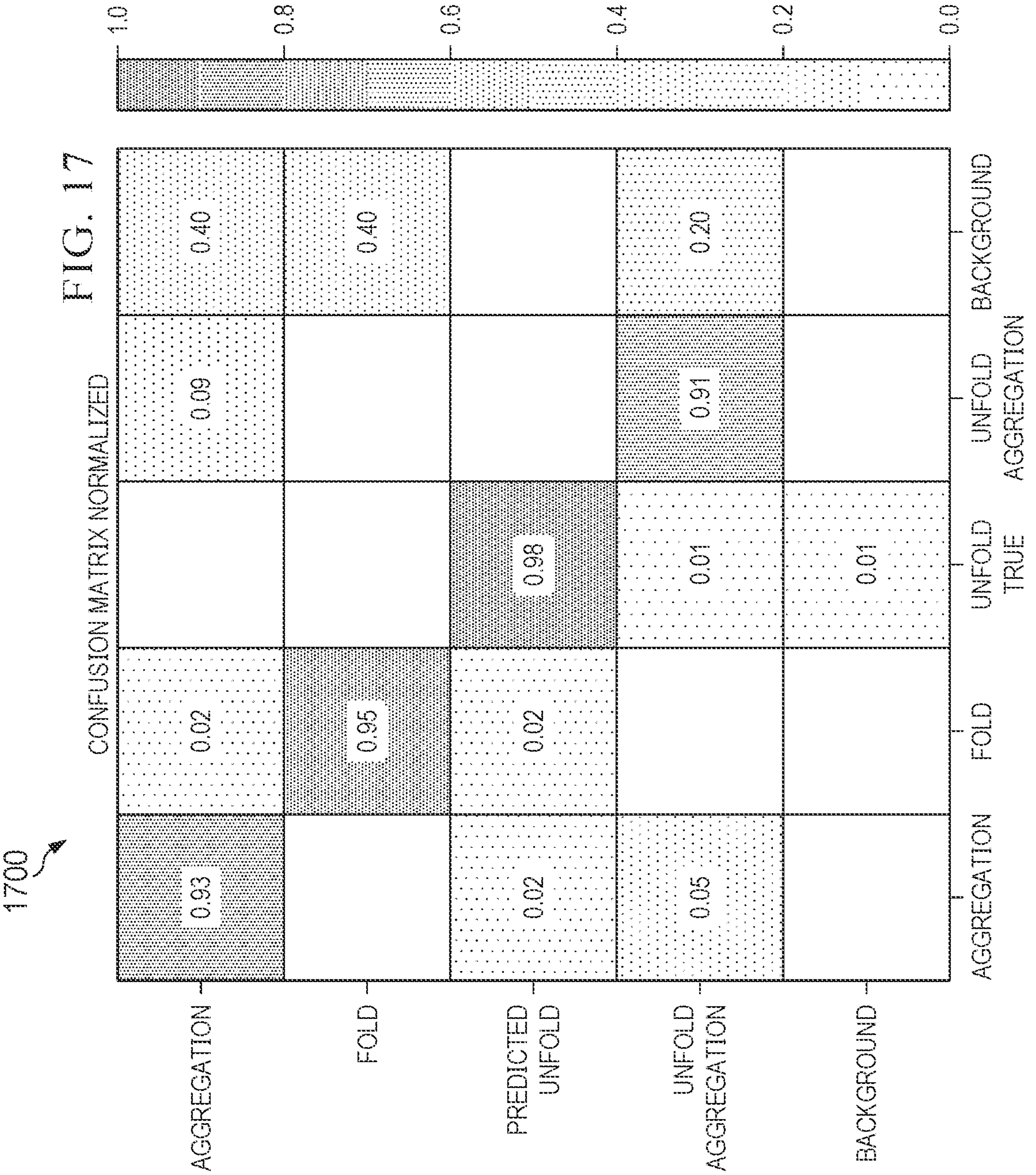
FIG. 17 is a graph of an example deep learning model confusion matrix for under-liquid foodstuff.

FIG. 17 is a graphical representation 1700 of an example confusion matrix, which shows that YOLOv8's detection of under-liquid foodstuff units using the test set may be satisfactory. As can be seen, accuracy may be slightly lower than the performance on the out-of-liquid dataset. This variation in performance may be attributed to the inherent challenges of under-liquid detection. For instance, liquids can introduce distortions, reflections, and occlusions, which can impede the model's ability to identify and localize the foodstuff units accurately.

In the preceding discussion and in the claims, the terms "including" and "comprising" are used in an open-ended fashion, and thus should be interpreted to mean "including, but not limited to . . . " Also, the term "couple" or "couples" is intended to mean either an indirect or direct connection. Thus, if a first device couples to a second device, that connection may be through a direct engagement between the two devices, or through an indirect connection that is established via other devices, components, nodes, and connections. In addition, as used herein, the terms "axial" and "axially" generally mean along or parallel to a particular axis (e.g., central axis of a body or a port), while the terms "radial" and "radially" generally mean perpendicular to a particular axis. For instance, an axial distance refers to a distance measured along or parallel to the axis, and a radial distance means a distance measured perpendicular to the axis. Any reference to up or down in the description and the claims is made for purposes of clarity, with "up", "upper", "upwardly", "uphole", or "upstream" meaning toward the surface of the borehole and with "down", "lower", "downwardly", "downhole", or "downstream" meaning toward the terminal end of the borehole, regardless of the borehole orientation. As used herein, the terms "approximately," "about," "substantially," and the like mean within 10% (i.e., plus or minus 10%) of the recited value. Thus, for example, a recited angle of "about 80 degrees" refers to an angle ranging from 72 degrees to 88 degrees.

A first component is directly coupled to a second component when there are no intervening components, except for a line, a trace, or another medium between the first component and the second component. The first component is indirectly coupled to the second component when there are intervening components other than a line, a trace, or another medium between the first component and the second component. The term "coupled" and its variants include both directly coupled and indirectly coupled. The use of the term "about" means a range including±10% of the subsequent number unless otherwise stated.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present disclosure.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, components, techniques, or methods without departing from the scope of the present disclosure. Other examples of changes, substitutions, and alterations are ascertainable by one skilled in the art and may be made without departing from the spirit and scope disclosed herein.

What is claimed is:

1. A singulation system comprising:

a tank configured to contain a volume of a liquid;

a plurality of liquid jets coupled to the tank;

a lifting device disposed within the tank, the lifting device comprising a grid plate;

a mechanical arm configured to be positioned above the tank;

a gripper coupled to the mechanical arm; and a machine vision system configured to control the mechanical arm and the gripper.

2. The singulation system of claim 1, wherein the tank comprises sidewalls, and wherein the plurality of liquid jets comprise:

a central rotary liquid jet configured to be positioned above the tank and configured to produce a horizontal liquid stream into the tank; and one or more sidewall liquid jets affixed to the sidewalls of the tank.

3. The singulation system of claim 1, wherein the plurality of liquid jets are configured to generate variable horizontal and vertical streams that engage with a batch of foodstuff to:

separate the batch of foodstuff into a plurality of individual foodstuff units; and orient the individual foodstuff units to a predetermined orientation.

4. The singulation system of claim 1, further comprising:

an input mechanism disposed to transport a plurality of foodstuff batches downstream into the tank; and an output mechanism disposed to transport individually separated and oriented foodstuff units downstream away from the tank.

5. The singulation system of claim 1, wherein the machine vision system comprises:

a camera configured to capture and transmit images of foodstuff arrangements; and a non-transitory computer-readable medium with stored instructions comprising an artificial intelligence (AI) model configured to detect, localize, and categorize foodstuff arrangement from images of foodstuff captured and transmitted from the camera.

6. The singulation system of claim 1 further comprising a liquid renewal system to enhance cleanliness of liquid and foodstuff in the tank.

7. The singulation system of claim 5, wherein the non-transitory computer-readable medium with stored instructions is further configured to inspect and grade foodstuff separation and orientation, and the singulation system further comprises a dewatering, flipping, and turning system including:

an air blower configured to dewater foodstuff; and a plurality of rotating paddles configured to flip and turn incorrectly oriented foodstuff units, wherein the air blower and the plurality of rotating paddles are positioned adjacent to an output mechanism that is disposed to transport individually separated foodstuff units downstream away from the tank.

8. A method for singulating foodstuff comprising:

releasing a batch of foodstuff into a tank comprising sidewalls and configured to contain a volume of liquid, wherein the liquid has a surface in the tank;

temporarily engaging a central rotary liquid jet to produce a horizontal stream of liquid into the tank;

lowering a lifting device comprising a grid plate into the tank to a predetermined depth under the surface of the liquid;

selectively engaging and disengaging sidewall liquid jets to generate under-liquid streams in the liquid; and wherein buoyant force and thrust force properties of the liquid in the tank are utilized to separate and manipulate orientation of the batch of foodstuff, resulting in a plurality of separated foodstuff units.

9. The method of claim 8, further comprising:

engaging the lifting device comprising the grid plate in the tank to lift the plurality of separated foodstuff units out of the liquid;

performing image acquisition of the plurality of separated foodstuff units by a machine vision system;

inspecting images, by the machine vision system, of the plurality of separated foodstuff units to determine whether one or more of the plurality of separated foodstuff units meet a threshold singulation percentage and a threshold unfold percentage; and when separated foodstuff units meet the threshold singulation percentage and the threshold unfold percentage, using a gripper to drag separated foodstuff units to an output mechanism.

10. The method of claim 9, wherein the gripper is used when a predetermined singulation completion percentage for singulating the batch of foodstuff has been achieved.

11. The method of claim 9, wherein the machine vision system is trained using an artificial intelligence (AI) model.

12. The method of claim 8, further comprising utilizing a liquid renewal system to clean the liquid in the tank.

13. The method of claim 9, wherein using the gripper further comprises:

engaging the gripper to pick up the one or more separated foodstuff units; and disengaging the gripper to drop the one or more separated foodstuff units onto an output mechanism.

14. The method of claim 8, further comprising:

before releasing the batch of foodstuff into the tank, loading the batch of foodstuff on an input mechanism; and transporting the batch of foodstuff on the input mechanism to the tank.

15. A non-transitory computer-readable medium comprising a computer program product for use by a singulation system, the computer program product comprising computer-executable instructions stored on the non-transitory computer-readable medium such that when executed by a processor cause the singulation system to train an artificial intelligence (AI) model of a machine vision system to singulate foodstuff by:

obtaining a training dataset comprising a plurality of images of input foodstuff and corresponding plurality of images of output foodstuff;

generating a plurality of candidate models having different architectures and parameters;

for each candidate model:

training the AI model on the training dataset; and evaluating performance of the AI model on a validation dataset;

selecting a preferred-performing model from the plurality of candidate models based on performance evaluation of the AI model on a validation dataset; and further training the preferred-performing model on a larger training dataset comprising the training dataset and additional data points.

16. The non-transitory computer-readable medium of claim 15, wherein the plurality of images of input foodstuff further comprises:

a plurality of images of under-liquid foodstuff, wherein the plurality of images of under-liquid foodstuff are used to assess singulation performance and selectively control operations of a central rotary liquid jet and one or more sidewall liquid jets; and a plurality of images of out-of-liquid foodstuff, wherein the plurality of images of out-of-liquid foodstuff are used to identify correctly separated and oriented foodstuff, and wherein the plurality of images are randomized to simulate a singulation process.

17. The non-transitory computer-readable medium of claim 15, wherein the plurality of images of input foodstuff and plurality of images of output foodstuff are categorized into categories comprising:

an Unfold category, comprising images of foodstuff units that are correctly separated from other foodstuff units or batches of foodstuff and correctly oriented for later processing;

an UnfoldAggregation category, comprising images of foodstuff units that are adjacent to and not separated from other foodstuff units or batches of foodstuff, but are otherwise correctly oriented;

a Fold category, comprising images of individual foodstuff units that are folded upon themselves but are otherwise correctly separated from other foodstuff units or batches of foodstuff; and an Aggregation category comprising images of individual foodstuff that are stacked upon and not correctly separated from other foodstuff units or batches of foodstuff.

18. The non-transitory computer-readable medium of claim 17, wherein the Unfold category and the UnfoldAggregation category do not require further manipulation operations for later processing, and wherein the Fold category and the Aggregation category require further manipulation operations by a singulation system to be correctly separated and correctly oriented.

19. The non-transitory computer-readable medium of claim 15, wherein, to accommodate designated singulation control parameters, the AI model of the machine vision system adjusts for:

drop-down height and lifting speed of a lifting device with a grid plate;

batch size of a batch of foodstuff;

batch weight of the batch of foodstuff; and numbers, locations, power outputs, and frequency of liquid jets.

20. The non-transitory computer-readable medium of claim 15, wherein the AI model of the machine vision system examines and compares multiple linear regression models to:

determine effects of control parameters;

determine effects for various production scales;

predict singulation and unfolding performance; and estimate batch sizes and related processing speeds.

* * * * *